US011122564B2

(12) United States Patent
Noh et al.

(10) Patent No.: US 11,122,564 B2
(45) Date of Patent: Sep. 14, 2021

(54) DOPPLER MODE IN A WIRELESS NETWORK

(71) Applicant: NEWRACOM, INC., Lake Forest, CA (US)

(72) Inventors: Yujin Noh, Irvine, CA (US); Seung Hyeok Ahn, Lake Forest, CA (US); Yongsuk Hwang, Irvine, CA (US); Dae Kyun Lee, Irvine, CA (US); Jong-ee Oh, Irvine, CA (US); Jaeyoung Ryu, Irvine, CA (US)

(73) Assignee: Newracom, Inc., Lake Forest, CA (US)

( * ) Notice: Subject to any disclaimer, the term of this patent is extended or adjusted under 35 U.S.C. 154(b) by 127 days.

(21) Appl. No.: 16/362,529

(22) Filed: Mar. 22, 2019

(65) Prior Publication Data
US 2019/0297622 A1 Sep. 26, 2019

Related U.S. Application Data

(60) Provisional application No. 62/646,842, filed on Mar. 22, 2018, provisional application No. 62/797,140, filed on Jan. 25, 2019.

(51) Int. Cl.
*H04W 72/04* (2009.01)
*H04L 29/06* (2006.01)
(Continued)

(52) U.S. Cl.
CPC ......... *H04W 72/0446* (2013.01); *H04L 69/22* (2013.01); *H04W 72/048* (2013.01);
(Continued)

(58) Field of Classification Search
CPC ... H04L 5/0053; H04L 5/0044; H04L 5/0083; H04L 69/22; H04W 72/048; H04W 72/0046; H04W 72/1263
See application file for complete search history.

(56) References Cited

U.S. PATENT DOCUMENTS 9,351,333 B1 * 5/2016 Zhang ................... H04L 5/0053
9,596,715 B1 * 3/2017 Zhang ................ H04L 27/2602
(Continued)

OTHER PUBLICATIONS

Part 11: Wireless LAN Medium Access Control (MAC) and Physical Layer (PHY) Specifications, IEEE Standards 802.11 (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Redentor Pasia

(57) ABSTRACT

A process for receiving a Physical Layer Protocol Data Unit (PPDU) may include receiving a first portion of the PPDU. The first portion including a Legacy Signal (L-SIG) field and a second signal field that is received after the reception of the L-SIG field. The process further includes decoding, using first information in the L-SIG field, the second signal field, and determining, using second information included in the second signal field, that the PPDU includes midambles. In response to determining that the PPDU includes midambles, the process determines, using a midamble periodicity M, a number of midambles NMA in the PPDU, determines, using the number of midambles, a number of data symbols in a data field of the PPDU, and processes, using the number of midambles and the number of data symbols, the data field of the PPDU. The process may be performed by a wireless device.

13 Claims, 9 Drawing Sheets

(51) Int. Cl.
*H04W 72/12* (2009.01)
*H04W 84/00* (2009.01)
*H04W 84/12* (2009.01)

(52) U.S. Cl.
CPC ...... *H04W 72/1263* (2013.01); *H04W 84/005* (2013.01); *H04W 84/12* (2013.01)

(56) References Cited

U.S. PATENT DOCUMENTS

| | | | |
|---|---|---|---|
| 9,706,599 B1* | 7/2017 | Zhang | H04L 27/2613 |
| 10,165,470 B2* | 12/2018 | Azizi | H04L 27/2602 |
| 10,382,598 B1* | 8/2019 | Zhang | H04L 25/0226 |
| 10,530,430 B2* | 1/2020 | Porat | H04L 27/2602 |
| 10,541,796 B2* | 1/2020 | Mu | H04L 27/2692 |
| 10,715,365 B2* | 7/2020 | Zhang | H04W 24/08 |
| 10,999,110 B2* | 5/2021 | Zhou | H04L 27/2602 |
| 2013/0279379 A1* | 10/2013 | Yang | H04L 27/2602 370/310 |
| 2015/0009978 A1* | 1/2015 | Choi | H04L 27/2613 370/338 |
| 2018/0006687 A1* | 1/2018 | Porat | H04L 27/2602 |
| 2018/0146076 A1* | 5/2018 | Verma | H04L 1/0025 |
| 2018/0359066 A1* | 12/2018 | Mu | H04L 27/2613 |
| 2019/0097857 A1* | 3/2019 | Zhang | H04L 5/0051 |

OTHER PUBLICATIONS

Part 11: Wireless LAN Medium Access Control (MAC) and Physical Layer (PHY) Specifications, Amendment 4: Enhancements for Very High Throughput for Operation in Bands below 6 GHz, IEEE Standards 802.11ac, 2013, pp. 1-395, IEEE (The Institute of Electrical and Electronic Engineers, Inc.), New York, NY, USA.

Part 11: Wireless LAN Medium Access Control (MAC) and Physical Layer (PHY) Specifications, Amendment 2: Sub 1 GHz License Exempt Operation, IEEE P802.11ah/D5.0, Mar. 2015, pp. 1-604, IEEE (The Institute of Electrical and Electronic Engineers, Inc.), New York, NY, USA.

* cited by examiner

Table 1:

| Element | definition | duration | DFT period | GI | Subcarrier spacing |
|---|---|---|---|---|---|
| L-STF | Non-HT Short Training field | 16 μs | - | - | |
| L-LTF | Non-HT Long Training field | 16 μs | 6.4 μs | 3.2 μs | 156.25 kHz |
| L-SIG | Non-HT SIGNAL field | 8 μs | 6.4 μs | 1.6 μs | 156.25 kHz |
| HE-DATA | DATA field | $N_{DATA}$ * (DFT period + GI)μs | 6.4 μs | 1.6 μs | 156.25 kHz |

FIG. 7

Table 2:

| Parameter | 20 MHz Channel (11a) | 10 MHz Channel (11p) |
|---|---|---|
| $N_{SD}$: Number of data subcarriers | 48 | 48 |
| $N_{DP}$: Number of pilot subcarriers | 4 | 4 |
| $N_{ST}$: Number of subcarriers, total | 52 ($N_{SD}+N_{SP}$) | 52 ($N_{SD}+N_{SP}$) |
| $\Delta_F$: Subcarrier frequency spacing | 0.3125 MHz | 0.15625 MHz |
| $T_{FFT}$: IFFT/FFT period | 3.2 μs ($1/\Delta_F$) | 6.4 μs ($1/\Delta_F$) |
| $T_{PREAMBLE}$: PHY Preamble duration | 16 μs ($T_{SHORT}+T_{LONG}$) | 32 μs ($T_{SHORT}+T_{LONG}$) |
| $T_{SIGNAL}$: Duration of the SIGNAL BPSK-OFDM symbol | 4 μs ($T_{GI}+T_{FFT}$) | 8 μs ($T_{GI}+T_{FFT}$) |
| $T_{GI}$: Guard Interval (GI) duration | 0.8 μs ($T_{FFT}/4$) | 1.6 μs ($T_{FFT}/4$) |
| $T_{GI2}$: Training Symbol GI duration | 1.6 μs ($T_{FFT}/2$) | 3.2 μs ($T_{FFT}/2$) |
| $T_{SYM}$: Symbol Interval | 4 μs ($T_{GI}+T_{FFT}$) | 8 μs ($T_{GI}+T_{FFT}$) |
| $T_{SHORT}$: Short Training Sequence duration | 8 μs ($10 \times T_{FFT}/4$) | 16 μs ($10 \times T_{FFT}/4$) |
| $T_{LONG}$: Long Training Sequence duration | 8 μs ($T_{GI2}+2\times T_{FFT}$) | 16 μs ($T_{GI2}+2\times T_{FFT}$) |

FIG. 8

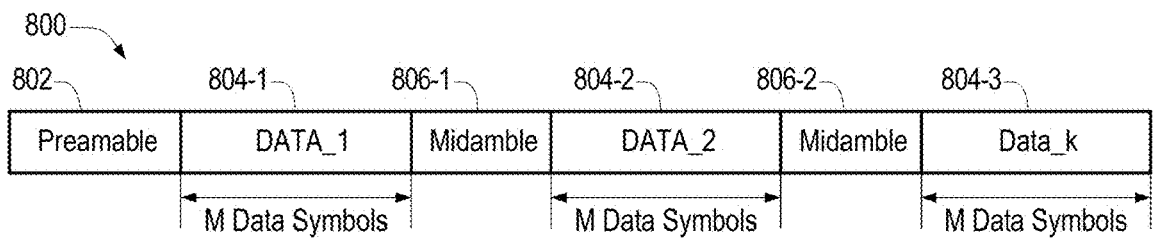

FIG. 9

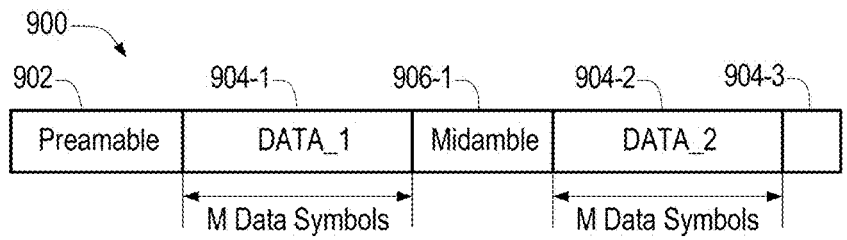

FIG. 14
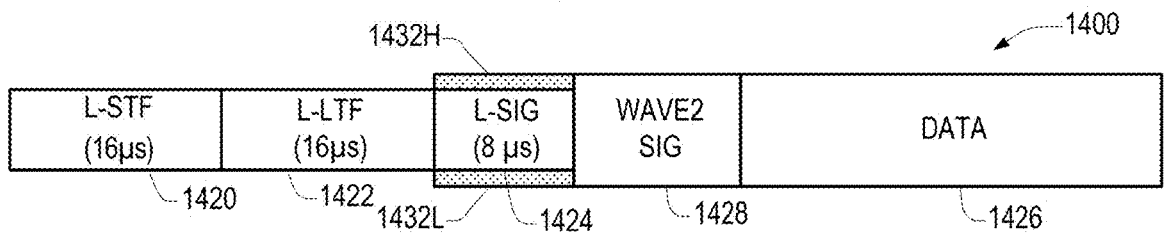
FIG. 15
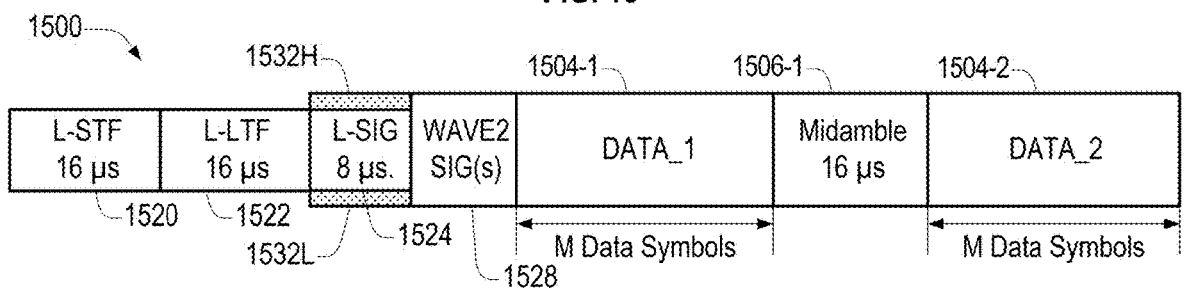
FIG. 16
Table 3:
| Seq# | Maximum 99.9% PAPR | Sequence | | | |
|---|---|---|---|---|---|
| | | k = −28 | k = −27 | k = +27 | k = +28 |
| 1 | 11.5439890169176 | 1 | 1 | 1 | 1 |
| 2 | 11.7559798669756 | −1 | 1 | 1 | 1 |
| 3 | 11.0247632082654 | 1 | −1 | 1 | 1 |
| 4 | 11.1132462729183 | −1 | −1 | 1 | 1 |
| 5 | 11.0308568688696 | 1 | 1 | −1 | 1 |
| 6 | 11.2221732344942 | −1 | 1 | −1 | 1 |
| 7 | 10.4667832783689 | 1 | −1 | −1 | 1 |
| 8 | 10.5375311035243 | −1 | −1 | −1 | 1 |
| 9 | 11.7149578452610 | 1 | 1 | 1 | −1 |
| 10 | 12.3474566483288 | −1 | 1 | 1 | −1 |
| 11 | 11.1773385196315 | 1 | −1 | 1 | −1 |
| 12 | 11.7522509687256 | −1 | −1 | 1 | −1 |
| 13 | 11.0987234304853 | 1 | 1 | −1 | −1 |
| 14 | 11.7572701498639 | −1 | 1 | −1 | −1 |
| 15 | 10.5091551858028 | 1 | −1 | −1 | −1 |
| 16 | 11.1262697705930 | −1 | −1 | −1 | −1 |

FIG. 17
Table 4:
| Seq# | Maximum 99.0% PAPR | Sequence k = -28 | k = -27 | k = +27 | k = +28 |
|---|---|---|---|---|---|
| 1 | 10.2706106595020 | 1 | 1 | 1 | 1 |
| 2 | 10.7363333311070 | -1 | 1 | 1 | 1 |
| 3 | 9.91154468364214 | 1 | -1 | 1 | 1 |
| 4 | 10.2800161947610 | -1 | -1 | 1 | 1 |
| 5 | 10.3023893730895 | 1 | 1 | -1 | 1 |
| 6 | 10.8164062029529 | -1 | 1 | -1 | 1 |
| 7 | 9.78948896317696 | 1 | -1 | -1 | 1 |
| 8 | 10.3164094519923 | -1 | -1 | -1 | 1 |
| 9 | 10.4323041382824 | 1 | 1 | 1 | -1 |
| 10 | 10.8492531738741 | -1 | 1 | 1 | -1 |
| 11 | 10.1837859104191 | 1 | -1 | 1 | -1 |
| 12 | 10.4427769469515 | -1 | -1 | 1 | -1 |
| 13 | 10.4044340151947 | 1 | 1 | -1 | -1 |
| 14 | 10.7918292766516 | -1 | 1 | -1 | -1 |
| 15 | 9.96623421218785 | 1 | -1 | -1 | -1 |
| 16 | 10.3583786056179 | -1 | -1 | -1 | -1 |
FIG. 18
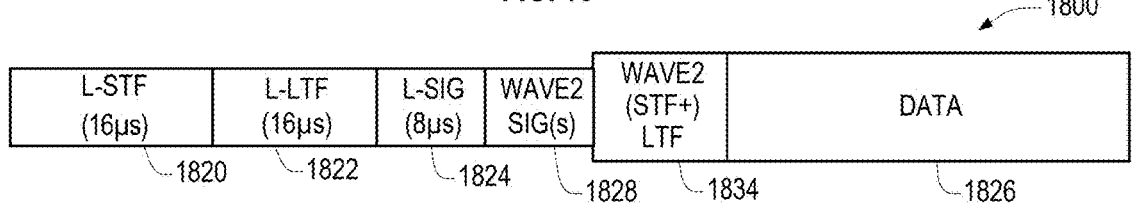
FIG. 19
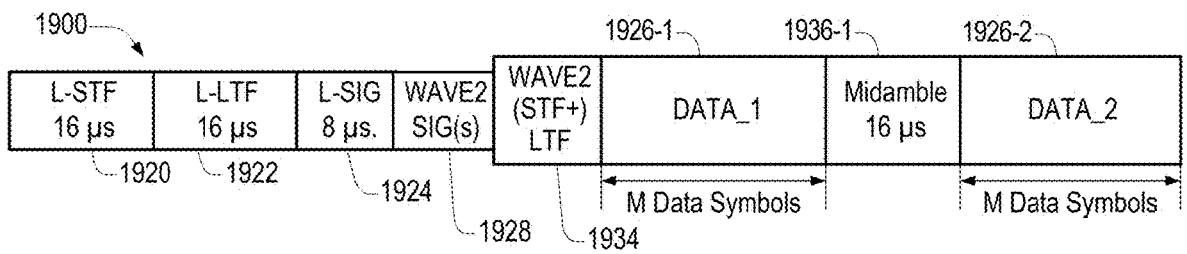

FIG. 20
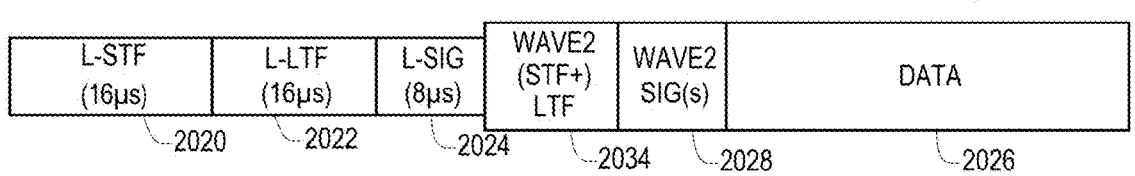
FIG. 21
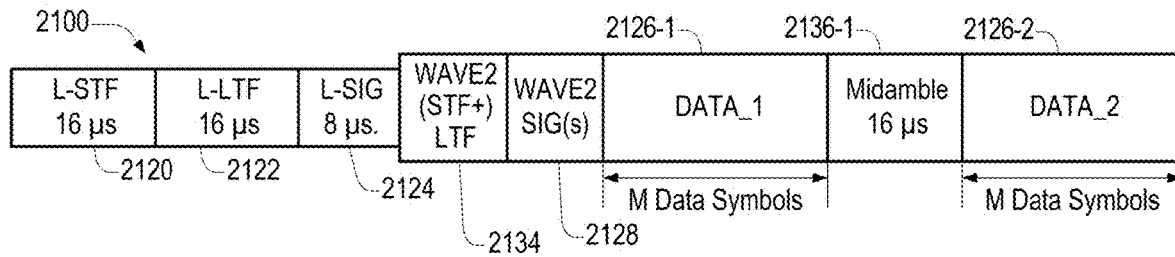
FIG. 22
Table 5:
| Bits 0-13 | Bit 14 | Bit 15 | Usage |
|---|---|---|---|
| 0 - 32767 | 0 | 0 | Duration value (in μs.) within all frames except PS-Poll frames that are not PS+Poll+BDT. |
| 0 - 16383 | 0 | 1 | Reserved |
| 0 | 1 | 1 | AID 0; used for broadcast transmission in S1G PPDU, reserved if not in S1G PPDU. |
| 1 - 2007 | 1 | 1 | AID in PS-Poll frames other than PS+Poll+BDT |
| 2008 - 8191 | 1 | 1 | Additional AIDs in S1G PS-Poll frames other than PS-Poll+BDT Reserved if not in S1G PS-Poll frame. |
| 8192 - 16383 | 1 | 1 | Reserved |

DOPPLER MODE IN A WIRELESS NETWORK

CROSS-REFERENCE TO RELATED APPLICATION

This application claims the benefit of U.S. Provisional Patent Applications No. 62/646,842, filed Mar. 22, 2018, and No. 62/797,140, filed Jan. 25, 2019, which are incorporated by reference herein in their entirety.

BACKGROUND

1. Technical Field

The technology described herein relates generally to wireless networking. More particularly, the technology relates to structural features of a transmission (such as midambles) that are used to improve the reception of the transmission in a wireless network such as a Vehicle-to-Everything (V2X) network.

2. Description of the Related Art

Wireless Local Area Network (WLAN) devices are currently being deployed in diverse environments. In addition, WLAN devices are increasingly required to support a variety of applications such as video, cloud access, and offloading.

WLANs are being employed for Vehicle to Everything (V2X) communications. V2X communications are part of a Direct Short Range Communication (DSRC) wireless technology. V2X systems may operate in conformance with one or more of the Institute of Electrical and Electronics Engineers (IEEE) 802.11p standard, the IEEE 1609 standards for Wireless Access in Vehicular Environments (WAVE), and the European Telecommunications Standards Institute (ETSI) Technical Committee on Intelligent Transport Systems (TC-ITS) European standards.

In some V2X or WAVE environments, channel conditions may change during the communication of a data unit. For example, when two communicating stations are moving with respect to each other, the Doppler effect may alter the channel conditions, and the changes from the Doppler effect may themselves change as the relative motions and positions of the two stations change. For example, when two communicating vehicles are moving past each other in opposite directions, the relative motions may be significant, and may change from approaching to receding during a long transmission, substantially altering the effect of a Doppler effect on the reception of the transmission.

There is a need for a receiving station to be able to detect and compensate for the alteration of channel conditions, such as the change in the Doppler effect, that may occur during the reception of a transmission from another station that may be moving relative to the receiving station.

SUMMARY

In an embodiment, a method is performed by a wireless device. The method comprises receiving a first portion of a Physical Layer Protocol Data Unit (PPDU), the first portion including a Legacy Signal (L-SIG) field and a second signal field, the second signal field being received after the reception of the L-SIG field. The method further includes decoding, using first information in the L-SIG field, the second signal field, and determining, using second information included in the second signal field, that the PPDU includes midambles. In response to determining that the PPDU includes midambles, the method determines, using a midamble periodicity M, a number of midambles $N_{MA}$ in the PPDU, determines, using the number of midambles, a number of data symbols in a data field of the PPDU, and processes, using the number of midambles and the number of data symbols, the data field of the PPDU.

In an embodiment, the second information includes an indication having a first state when the PPDU does not include midambles and a second state when the PPDU includes midambles.

In an embodiment, the second information further includes an indication of the midamble periodicity M.

In an embodiment, the midamble periodicity M is a predetermined number.

In an embodiment, the first information includes a Length field with a value of LENGTH.

In an embodiment, determining the number of midambles $N_{MA}$ includes determining the number of midambles $N_{MA}$ according to:

$$N_{MA} = \left\lfloor \frac{\frac{4 \cdot (\text{LENGTH}+3)}{3} - T_{PA} - T_{SYM} \cdot \beta}{T_{MA} + M \cdot T_{SYM}} \right\rfloor$$

wherein $T_{PA}$ is a duration of a preamble, the preamble including the second signal field, $T_{MA}$ is a duration of a midamble, $T_{SYM}$ is a duration of the data symbols of the data field, and $\beta$ is a predetermined integer number greater than or equal to one.

In an embodiment, $\beta$ is one of 1, 2, or 4.

In an embodiment, determining the number of midambles $N_{MA}$ includes determining the number of midambles $N_{MA}$ according to:

$$N_{MA} = \left\lfloor \frac{\frac{4 \cdot (\text{LENGTH}+3)}{3} - T_{PA} - T_{SYM}(M+\beta)}{T_{MA} + M \cdot T_{SYM}} \right\rfloor$$

wherein $T_{PA}$ is a duration of a preamble, the preamble including the second signal field, $T_{MA}$ is a duration of a midamble, $T_{SYM}$ is a duration of the data symbols of the data field, and $\beta$ is a predetermined integer number greater than or equal to one.

In an embodiment, receiving the data field comprises receiving a plurality of consecutive data symbols, wherein the number of data symbols in the plurality of data symbols is equal to the midamble periodicity M, receiving a midamble immediately following the plurality of consecutive data symbols, characterizing the channel using the midamble, and receiving one or more remaining consecutive data symbols using the results of characterizing the channel using the midamble.

In an embodiment, a total number of subcarriers used to carry information in a data symbol is greater than a total number of subcarriers used to carry information in a symbol of the L-SIG field, and the midamble permits channel characterization for every subcarrier used to carry information in the data symbol.

In an embodiment, a wireless device comprises a receiver and a processor. The processor is configured to receive, using the receiver, a first portion of a Physical Layer Protocol Data Unit (PPDU), the first portion including a Legacy Signal (L-SIG) field and a second signal field. The second signal field is received after the reception of the L-SIG field. The processor is further configured to decode, using first information in the L-SIG field, the second signal field, and determine, using second information included in the second signal field, that the PPDU includes midambles. In response to determining that the PPDU includes midambles, the processor determines, using a midamble periodicity M, a number of midambles $N_{MA}$ in the PPDU, determines, using the number of midambles, a number of data symbols in a data field the PPDU, and processes, using the number of midambles and the number of data symbols, the data field of the PPDU.

In an embodiment, the second information includes an indication having a first state when the PPDU does not include midambles and a second state when the PPDU includes midambles.

In an embodiment, the second information further includes an indication of the midamble periodicity M.

In an embodiment, the midamble periodicity M is a predetermined number.

In an embodiment, the first information includes a Length field with a value of LENGTH.

In an embodiment, determining the number of midambles $N_{MA}$ includes determining the number of midambles $N_{MA}$ according to:

$$N_{MA} = \left\lfloor \frac{\frac{4 \cdot (\text{LENGTH} + 3)}{3} - T_{PA} - T_{SYM} \cdot \beta}{T_{MA} + M \cdot T_{SYM}} \right\rfloor$$

wherein $T_{PA}$ is a duration of a preamble, the preamble including the second signal field, $T_{MA}$ is a duration of a midamble, $T_{SYM}$ is a duration of the data symbols of the data field, and β is a predetermined integer number greater than or equal to one.

In an embodiment, β is one of 1, 2, or 4.

In an embodiment, determining the number of midambles $N_{MA}$ includes determining the number of midambles $N_{MA}$ according to:

$$N_{MA} = \left\lceil \frac{\frac{4 \cdot (\text{LENGTH} + 3)}{3} - T_{PA} - T_{SYM}(M + \beta)}{T_{MA} + M \cdot T_{SYM}} \right\rceil$$

wherein $T_{PA}$ is a duration of a preamble, the preamble including the second signal field, $T_{MA}$ is a duration of a midamble, $T_{SYM}$ is a duration of the data symbols of the data field, and β is a predetermined integer number greater than or equal to one.

In an embodiment, receiving the data field comprises receiving a plurality of consecutive data symbols, wherein the number of data symbols in the plurality of data symbols is equal to the midamble periodicity M, receiving a midamble immediately following the plurality of consecutive data symbols, characterizing the channel using the midamble, and receiving one or more remaining consecutive data symbols using the results of characterizing the channel using the midamble.

In an embodiment, a total number of subcarriers used to carry information in a data symbol is greater than a total number of subcarriers used to carry information in a symbol of the L-SIG field, and the midamble permits channel characterization for every subcarrier used to carry information in the data symbol.

BRIEF DESCRIPTION OF THE DRAWINGS

FIG. 7 shows a Table 2 comparing properties of two networking standards having different channel bandwidths.

FIG. 8 illustrates a PPDU, including midambles, according to an embodiment.

FIG. 9 illustrates a PPDU, including a midamble, according to an embodiment.

FIG. 14 illustrates a PPDU, including extra tones, according to an embodiment.

FIG. 15 illustrates a PPDU, including extra tones and a midamble, according to an embodiment.

FIG. 16 shows a Table 3 showing maximum 99.9% Peak to Average Power Ratios (PAPRs) for sequences in the extra tones of FIGS. 14 and 15.

FIG. 17 shows a Table 4 showing maximum 99.0% Peak to Average Power Ratios (PAPRs) for sequences in the extra tones of FIGS. 14 and 15.

FIG. 18 illustrates a PPDU including extra tones, according to another embodiment.

FIG. 19 illustrates a PPDU including extra tones and a midamble, according to another embodiment.

FIG. 20 illustrates a PPDU including extra tones, according to another embodiment.

FIG. 21 illustrates a PPDU including extra tones and a midamble, according to another embodiment.

FIG. 22 shows a Table 5 of encodings of a Duration/ID field according to an embodiment.

DETAILED DESCRIPTION

Figure 1:
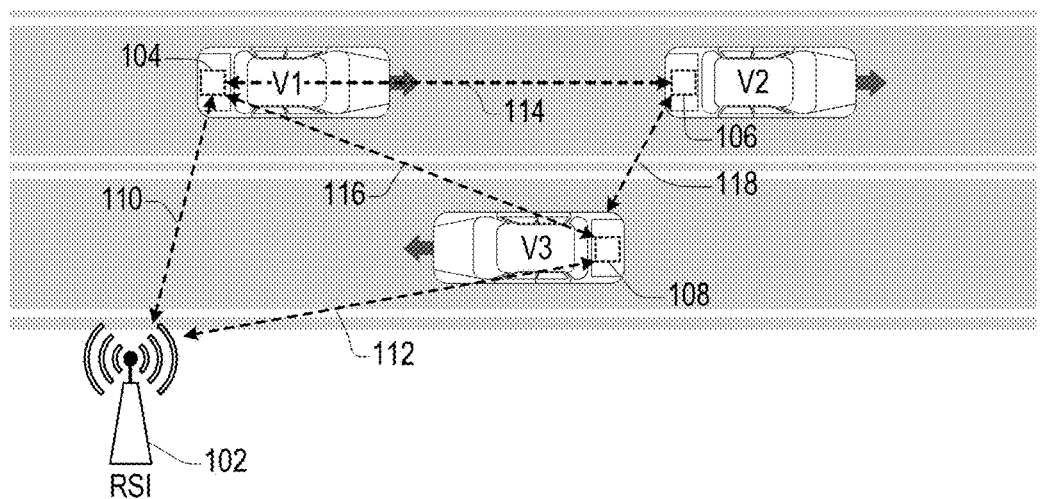
FIG. 1 illustrates a Vehicle to Everything (V2X) wireless network, according to an embodiment.

The technology described herein relates generally to wireless networking. More particularly, the technology relates to communication of Physical layer Protocol Data Units (PPDUs) including data fields, wherein the data field include midambles.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates Vehicle to Everything (V2X) wireless network, wherein a first vehicle V1, a second vehicle V2, and a third vehicle V3 communicate with each other and with a Road Side Infrastructure (RSI) 102. The first and second vehicles 104 and 106 are traveling left to right, and the third vehicle 108 is traveling right to left. The RSI 102 is stationary.

The first vehicle V1 includes a first station (STA) 104 for communicating in the V2X wireless network. The second vehicle V2 includes a second STA 106 for communicating in the V2X wireless network. The third vehicle V3 includes a third STA 108 for communicating in the V2X wireless network. Each of the first, second, and third STA 104, 106, and 108 and the RSI 102 may communicate in the V2X wireless network according to an IEEE 802.11 wireless standard.

Because the first vehicle V1 is traveling at nearly a right angle to a first communication 110 between the first station 104 and the RSI 102, changes in the channel conditions due to a Doppler effect may initially be small. But as the first vehicle V1 continues to move, channel conditions may change as the angle of the transmission relative to the first vehicle V1 and to the RSI 102 changes (for example, as a result of beam widths and directions of the antennas thereof), the distance changes, and the Doppler effect may increase. Similarly, as the third vehicle V3 approaches the RSI 102, because of the changes in angle and relative velocity between the two, the channel conditions for the second communication 112 between the RSI 102 and the third STA 108 may change because of changes in the Doppler effect, the decreased distance, and the beam widths and directions of the RSI 102 and the third STA 108.

Because the first vehicle V1 is traveling in the same direction and at nearly the same speed as the second vehicle V2, the third transmission 114 may not see much change in channel conditions because of changes in the Doppler effect, attenuation due to distance, or beam width and direction. However, as the first and second vehicles V1 and V2 travel, changes in the surrounding environment (for example, if they enter a tunnel that causes multipath transmissions) may change the channel conditions during the transmission 114.

A fourth communication 116 between the first STA 104 of the first vehicle V1 and the third STA 108 of the third vehicle V3 may experience changes in the channel conditions for the same reasons as the second communication 112, but to a higher degree because of the higher relative velocity between the first vehicle V1 and the third vehicle V3. This is also the case for a fifth communication 118 between the second STA 106 of the second vehicle V2 and the third STA 108 of the third vehicle V3. The first to third vehicles V1, V2, and V3 may be traveling at velocities as high as 200 km/h or more.

Accordingly, devices designed for V2X application should be able to work well in rapidly varying communication environments. Additionally, while devices for V2X application should be able to work in dense urban environment, they should also have utility in rural areas, and therefore should have communication ranges up to 1 km.

Similar to IEEE Std 802.11a, the IEEE Std 802.11p specification supports Orthogonal Frequency Division Multiplexing (OFDM) communication using 64 subcarriers. After excluding a DC and guard tones, 52 carriers remain, comprising 48 data subcarriers and 4 pilot subcarriers. The pilot subcarriers transmit a fixed pattern that a receiver may use to measure frequency and phase offset. Each of 48 data subcarriers can be modulated with Binary Phase Shift Keying (BPSK), Quadrature Phase Shift Keying (QPSK), 16-point Quadrature Amplitude Modulation (16-QAM) or 64-QAM.

In contrast to IEEE 802.11a, IEEE 802.11p uses a half clocked mode with a 10 MHz bandwidth, in order to make signal more robust against fading, resulting in corresponding data rate reduction compared to IEEE 802.11a. IEEE 802.11p supports Binary Convolution Coding (BCC) for Forward Error Correction (FCC) and one spatial stream.

Each of the stations 104 to 108 and the RSI 102 includes a processor and one or more transceiver circuits, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations 104, 106, and 108 and the RSI 102 may be respectively implemented using hardware components, software components, or both.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and/or a subtype field included in a control field of the frame, as prescribed in the applicable standard.

Figure 2:
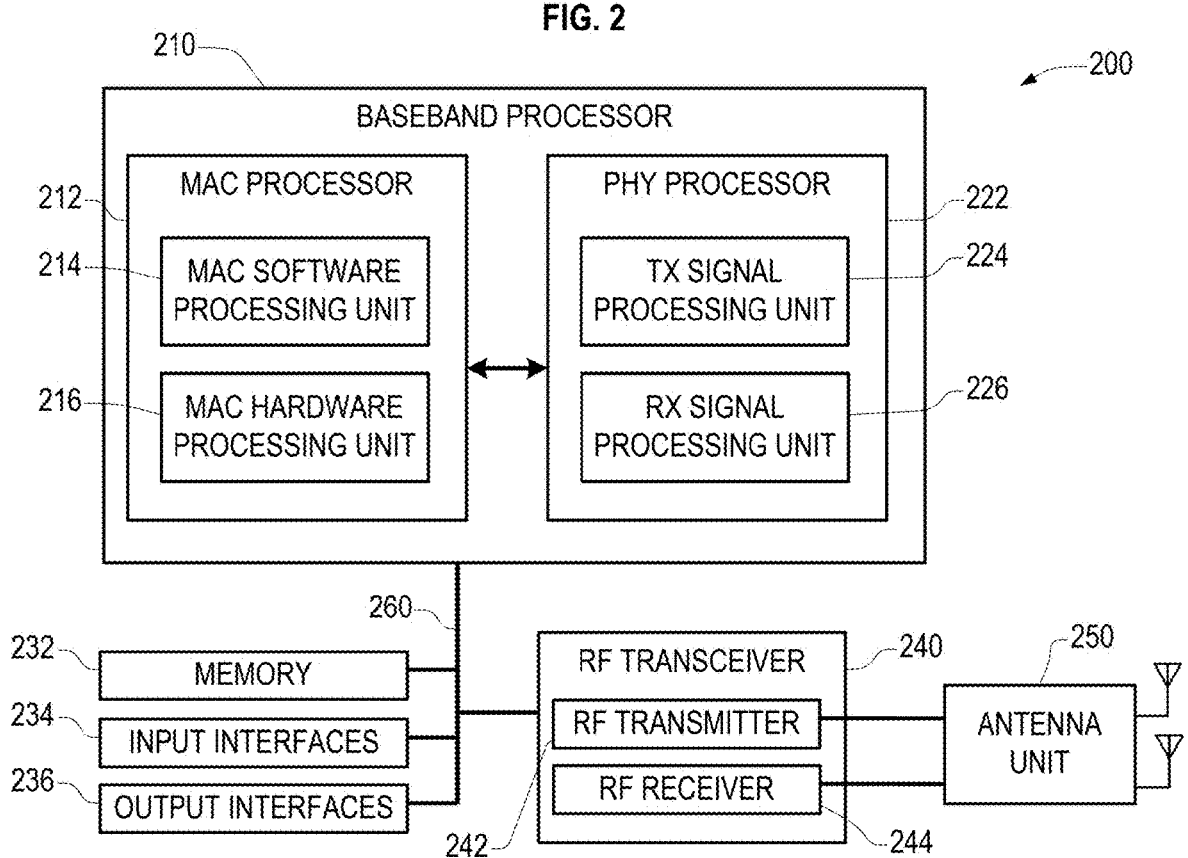
FIG. 2 is a schematic diagram of a wireless device, according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a Media Access Control (MAC) processor 212 and a Physical layer (PHY) processor 222. The baseband processor 210 may utilize the memory 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
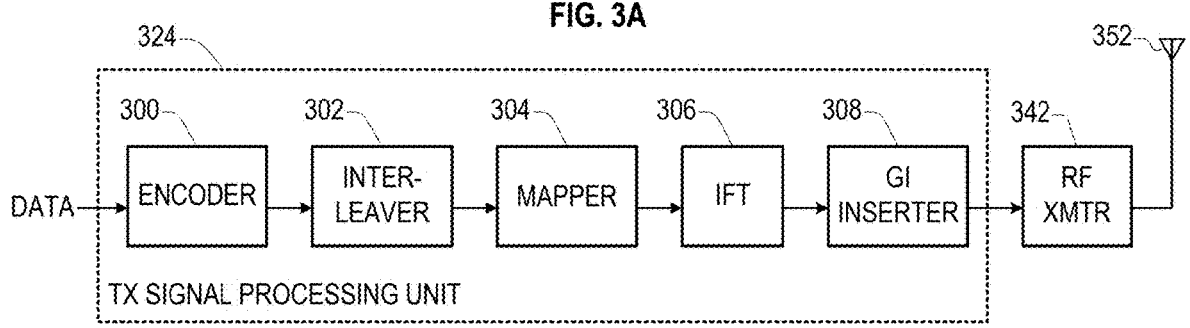
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0 s or 1 s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
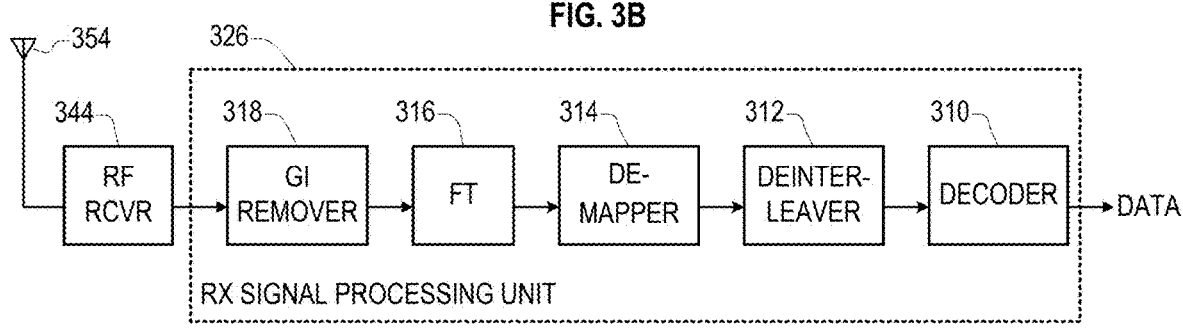
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
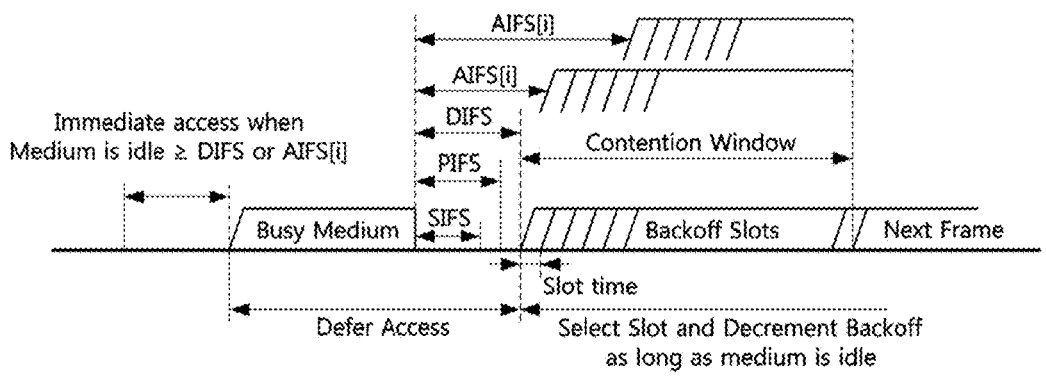
FIG. 4 illustrates Inter-Frame Space (IFS) relationships.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
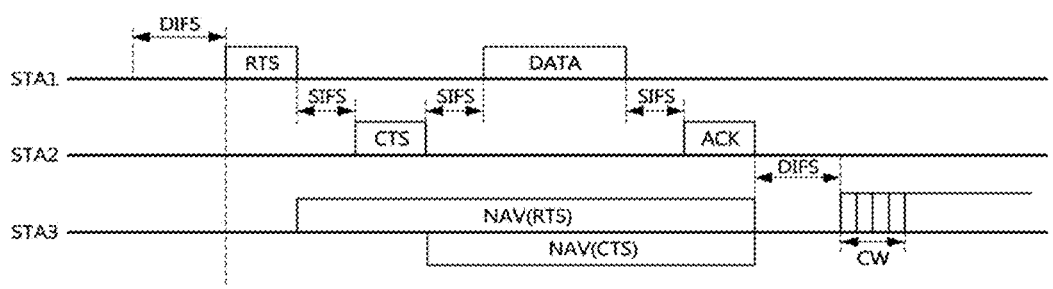
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated.

The descriptions below, for sake of completeness and brevity, refer to OFDM-based 802.11 technology. Unless otherwise indicated, a station refers to a non-AP STA.

Figures 6A, 6B:
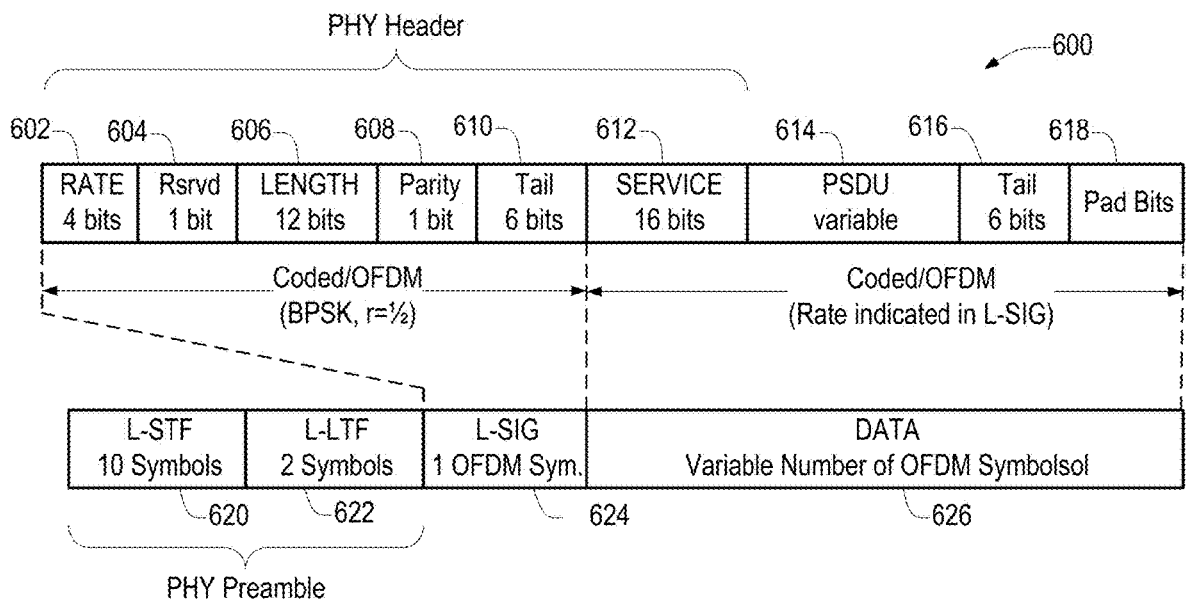
FIG. 6A illustrates a Physical layer Protocol Data Units (PPDU) of a wireless networking standard.
FIG. 6B shows a Table 1 disclosing properties of fields of the PPDU of FIG. 6A.

FIG. 6A illustrates an PPDU 600 according to an embodiment. A transmitting station generates the PPDU 600 and transmits it to one or more receiving stations. The receiving stations receive, detect, and process the PPDU 600.

The PPDU 600 includes the OFDM PHY preamble, a Legacy Signal (L-SIG) field 624 communicated using one OFDM symbol, and a Data field 626 communicated using a variable number of OFDM symbols. The Data field 626 includes a SERVICE field 612 having 16 bits, a Physical layer Service Data Unit (PSDU) 614 having a variable number of bits, a second Tail field 616 having 6 bits, and a variable number of pad bits 618. FIG. 6B includes a Table 1 providing additional details of fields of the PPDU 600.

The PHY Preamble of the PPDU 600 includes a Legacy Short Training Field (L-STF) 620 having 10 symbols and a Legacy Long Training Field (L-LTF) 622 having 2 symbols.

The PHY header includes the L-SIG field 624 and the SERVICE field 612, and contains the following fields: a Rate field 602, a reserved bit 604, a Length field 606, a parity bit 608, a first Tail field 610 having 6 bits, and the SERVICE field 612. The Rate field 602, reserved bit 604, Length field 606, parity bit 608, and first Tail field 610 constitute a single OFDM symbol having 48 data carriers, the L-SIG field 624, which is transmitted with a robust combination of BPSK modulation and a coding rate of R=½, allowing the L-SIG field 624 to carry 24 bits of information.

The SERVICE field 612 of the PHY header, the PSDU 614, the second Tail bits 616, and the pad bits 618 that comprise the Data field 626 are transmitted at the data rate described in the RATE field 602 and together may constitute multiple OFDM symbols.

The first tail bits 610 in the L-SIG 624 enable decoding of the RATE field 602 and the LENGTH field 606 immediately after the reception of the first tail bits 610. The RATE field 602 and the LENGTH field 606 must be decoded before the decoding of the DATA field 626 can be performed.

In an embodiment, the L-SIG field 624 includes an indication of whether the PPDU is a WAVE2 PPDU. For example, a value of a LENGTH field module 3 not being equal to zero might indicate that the PPDU is a WAVE2 PPDU, but embodiments are not limited thereto. In the PPDU 600, this indication indicates that the PPDU is not a WAVE2 PPDU. In the embodiments of FIGS. 8-15 and FIGS. 18-21, the indication would indicate that the PPDUs therein are WAVE2 PPDUs.

FIG. 7 includes a Table 2 comparing properties of a wireless network having a 20 MHz channel bandwidth (in particular, a wireless network according to IEEE 802.11a) and a wireless network having a 10 MHz channel bandwidth (in particular, a wireless network according to IEEE 802.11p).

The solutions provided herein have been described with reference to a wireless LAN system; however, it should be understood that these solutions are also applicable to other network environments, such as cellular telecommunication networks, wired networks, etc.

An embodiment of the invention may be an article of manufacture in which a non-transitory machine-readable medium (such as microelectronic memory) has stored thereon instructions which program one or more data processing components (generically referred to here as a "processor" or "processing unit") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment of the invention may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Considering demanding use cases in tough and different environments, the existing IEEE 802.11p standard may not be sufficient to support future V2X and DSRC applications. Since the adoption of the IEEE 802.11p standard, the 802.11 Physical layer (PHY) has evolved and developed further with different features such as advanced coding, varying symbol duration, different GIs, higher data rate and a method to deal with high Doppler environment. In order to support high throughput and reliable performance for future uses, those advanced technologies should be considered for adoption in a new V2X and/or DSRC networking standard.

In a standard that is an evolution of the IEEE 802.11p standard and/or WAVE (the evolved standard being herein referred to as a WAVE2 standard), Doppler related information is used to support use cases in high Doppler circumstances. Doppler information in a WAVE2 format PPDU may have a first value (e.g., 1), when one or more Midamble fields are inserted after M data symbols, of the PPDU, M being a predetermined midamble periodicity, and a second value (e.g., 0) when midambles are not inserted.

FIG. 8 illustrates a WAVE2 PPDU 800 PPDU according to an embodiment. The PPDU 800 includes a preamble 802, a first data field 804-1, a first midamble 806-1, a second data field 804-2, a second midamble 806-2, and a third data field 804-3. Although the PPDU 800 is shown as having two midambles 806, embodiments are not limited thereto, and the PPDU may have any integer number greater than or equal to 0 of midambles.

The preamble 802 may include an L-STF, an L-LTF, an L-SIG field, and one or more WAVE2 Signal fields, as described below. In embodiments, the preamble 802 may also include one or more WAVE2 STF fields, as described below. In embodiments, the preamble 802 may also include one or more WAVE2 LTF fields, as described below.

At a transmit side, the number of data symbols $N_{SYM}$ in the PPDU 800 could be derived differently depending on whether a Forward Error Correction (FEC) coding scheme used is Block Convolution Coding (BCC) or Low Density Parity Coding (LDPC), as shown in Equations 1 and 2, respectively.

$$BCC: N_{SYM} = \left\lceil \frac{8 \cdot \text{LENGTH} + N_{Tail} + N_{Service}}{N_{DBPS}} \right\rceil = \left\lceil \frac{8 \cdot \text{LENGTH} + 22}{N_{DBPS}} \right\rceil \qquad \text{Eq. 1}$$

$$LDPC: N_{SYM} = \left\lceil \frac{8 \cdot \text{LENGTH} + N_{Service}}{N_{DBPS}} \right\rceil = \left\lceil \frac{8 \cdot \text{LENGTH} + 16}{N_{DBPS}} \right\rceil \qquad \text{Eq. 2}$$

In Equations 1 and 2, $N_{DBPS}$ is the number of data bits per OFDM symbol, LENGTH indicates the number of octets in the PSDU the MAC is currently requesting the PHY to transmit, and $N_{Service}$ and $N_{Tail}$ are the number of bits in the SERVICE (16) and the Tail (6) fields of the Data field, respectively.

In an embodiment, the transmitter inserts a midamble field after every M data symbols, where M is a predetermined midamble periodicity, and for a number of data symbols $N_{SYM}$, the transmitter inserts a number of Midamble fields $N_{MA}$ according to Equation 3.

$$N_{MA} = \lfloor (N_{SYM}-1)/M \rfloor \qquad \text{Eq. 3}$$

For example, given $N_{SYM}=30$ and $M=10$, $N_{MA}=2$.

FIG. 9 illustrates a WAVE2 PPDU 900 PPDU according to an embodiment. Elements of FIG. 9 having reference characters of the form 9xx-x correspond to elements of FIG. 8 having reference characters of the form 8xx-x, and descriptions thereof are therefore omitted in the interest of brevity.

In the embodiment shown in FIG. 9, midamble-induced overhead is reduced by not inserting a midamble field when, after M data symbols, less than β data symbols remain to be transmitted. The estimate of the channel conditions derived from the last transmitted midamble is therefore used to receive the last M+(β−1) data symbols, on the assumption that when β is substantially less than M, channel conditions will be sufficiently similar across all M+(β−1) data symbols to allow reception.

Accordingly, in the embodiment illustrated in FIG. 9, the number of Midamble fields N is given by the following Equation 4:

$$N_{MA} = \lceil (N_{SYM} - (\beta - 1))/M \rceil - 1 \qquad \text{Eq. 4}$$

wherein $1 \leq \beta \leq M$ and $0 \leq N_{MA}$. For example, if $\beta=2$ and the third data field 904-3 includes 2 or fewer data symbols, then a Midamble is not inserted between the second data field 904-2 and the third data field 904-3. In an illustrative embodiment, when $N_{SYM}=11$, $M=10$ and $\beta=2$, then third data field 904-3 contains 1 data symbol. In another illustrative embodiment, $M=10$ and $\beta=4$.

In an embodiment, an OFDM transmission time (TX-TIME) calculation for the value of the TXTIME parameter returned by a PLME-TXTIME.confirm primitive shall be set according to the following Equation 5:

$$\text{TXTIME} = T_{PREAMBLE} + T_{SIGNAL} + T_{PA} + T_{SYM} \times N_{SYM} + T_{MA} \times N_{MA} \qquad \text{Eq. 5}$$

where $T_{PREAMBLE}$ is summation of duration of L-STF and L-LTF, $T_{SIGNAL}$ is the duration of L-SIG, $T_{SYM}$ is the duration of each data OFDM symbol, $T_{MA}$ is the duration of each Midamble field, $N_{SYM}$ is the number of encoded data symbols, and $T_{PA}$ is the duration of a WAVE2-related preamble field (i.e. a WAVE2 preamble duration), as described below.

Figure 10:
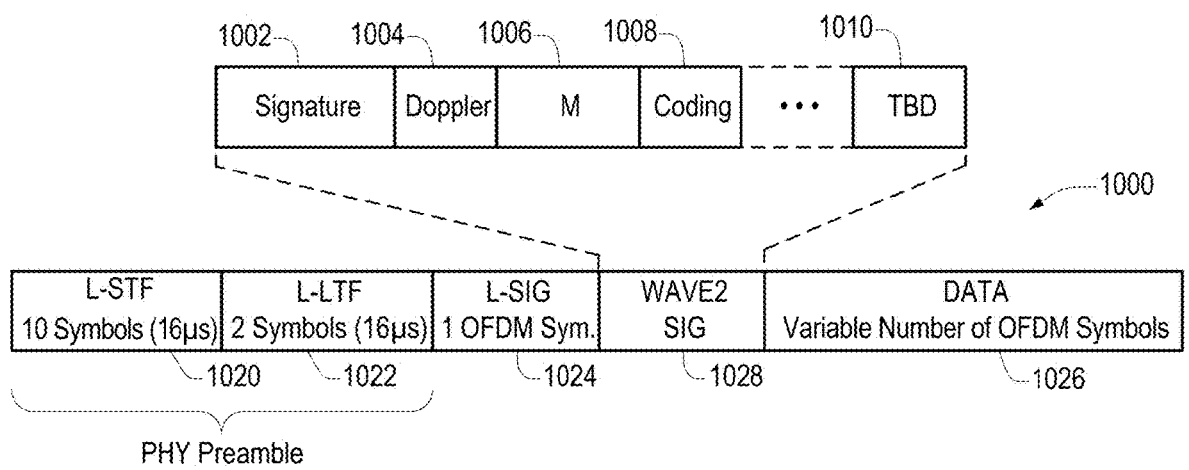
FIG. 10 illustrates a PPDU, according to an embodiment.

FIG. 10 illustrates a WAVE2 PPDU 1000 according to an embodiment. The PPDU 1000 includes a PHY Preamble including an L-STF 1020 and an L-LTF 1022, an L-SIG field 1024, a WAVE2 Signal (SIG) field 1028, and a data field 1026. The data field 1026 includes one or more OFDM data symbols.

In an embodiment, the WAVE2 SIG field 1028 includes a plurality of WAVE2 SIGx fields (e.g., a WAVE2 SIG1 field, a WAVE2 SIG2 field, and so on). In an embodiment, the WAVE2 SIG field 1028 includes a plurality of OFDM symbols.

The WAVE2 SIG field 1028 may include one or more of a signature field 1002, a Doppler field 1004, including Doppler information, a midamble periodicity field 1006 indicating a number of data symbols before midambles, a coding field 1008 indicating a coding scheme of the OFDM data symbols in the data field 1026, and the like. The duration of the WAVE2 SIG field 1028 is equal to the WAVE2 preamble duration $T_{PA}$ in Equation 5.

Figure 11:
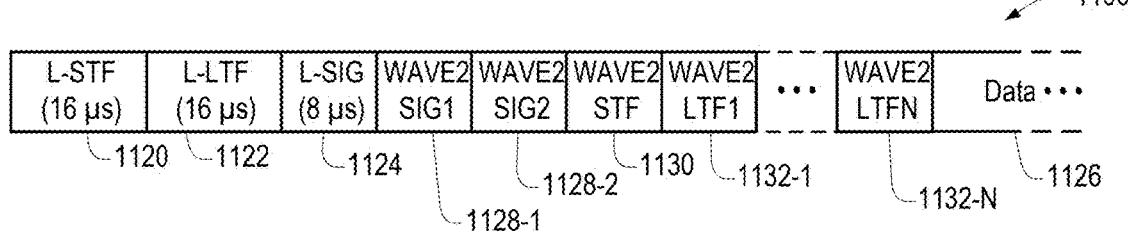
FIG. 11 illustrates a PPDU, according to another embodiment.

FIG. 11 illustrates a WAVE2 PPDU 1100, according to an embodiment. The PPDU 1100 includes a PHY Preamble including an L-STF 1120 and an L-LTF 1122, an L-SIG field 1124, a WAVE2 Signal 1 (SIG1) field 1028-1, a WAVE2 Signal 2 (SIG2) field 1028-2, a WAVE2 STF field 1130, first to $N^{th}$ WAVE2 LTF fields 1132-1 to 1132-N, and a data field 1126. The data field 1126 includes one or more OFDM data symbols.

The sum of the durations of the WAVE2 Signal 1 (SIG1) field 1028-1, WAVE2 Signal 2 (SIG2) field 1028-2, WAVE2 STF field 1130, and first to $N^{th}$ WAVE2 LTF fields 1132-1 to 1132-N is equal to the WAVE2 preamble duration $T_{PA}$ in Equation 5.

In embodiments, a TXTIME for a WAVE2 PPDU complies with a 4 µs boundary rule, wherein the value of TXTIME is indicated in units of 4 µs. This provides for fairness when both devices (i.e., transmitting and receiving devices) are operating according to the IEEE 802.11p standard and devices operating according to the WAVE2 standard are competing for access to use the same wireless medium. Because $T_{PA}$, $T_{SYM}$, and $T_{MA}$ may not be integer multiples of 4 µs, depending on a duration of a guard interval (GI) or the use of a compressed WAVE2 LTF (where a 1×WAVE2-LTF or 2×WAVE2-LTF is equivalent to modulating every 4 or 2 tones in an OFDM symbol of non-compressed WAVE2 LTF, respectively), in this embodiment, TXTIME is calculated according to the following Equation 6:

$$\text{TXTIME} = T_{PREAMBLE} + T_{SIGNAL} + T_{WAVE2-SIG(s)} + 4 \times \left\lceil \frac{T_{WAVE2\_PREAMBLE} + N_{SYM} T_{SYM} + N_{MA} T_{MA}}{4} \right\rceil \qquad \text{Eq. 6}$$

wherein $T_{WAVE2-SIG(S)}$ is the duration of WAVE2 SIG OFDM symbol(s), and $T_{WAVE2-PREAMBLE}$ is equal to the combined durations of the WAVE2 STF and WAVE2 LTF OFDM symbols.

If the TXTIME of a WAVE2 PPDU does not follow the 4 µs boundary rule, there could be unfairness between IEEE 802.11p devices and WAVE2 devices. When receiving a WAVE2 PPDU, the IEEE 802.11p STA would believe the WAVE2 PPDU is an IEEE 802.11p PPDU having a TXTIME that is an integer multiple of 4 µs. However, when a WAVE2 PPDU is received by WAVE2 STAs, it has the exact knowledge of the TXTIME. If the TXTIME is not rounded up to represent an integer multiple of 4 µs, WAVE2 devices and IEEE 802.11p devices may compute different value for TXTIME for a same WAVE2 PPDU, which can result in unfairness in medium access because the WAVE2 device may begin trying to access the medium sooner after the end of the WAVE2 PPDU than the 802.11p device.

In embodiments, value of duration could be differently determined based on which timing parameters, such as those shown for the full-clocked with 20 MHz channel (e.g., IEEE 802.11a) or the half-clocked with 10 MHz channel (e.g., IEEE 802.11p) operations shown in Table 2 of FIG. 7.

In an embodiment, for a given number of data symbols $N_{SYM}$ in a PPDU, the transmitter sets a Length field in an L-SIG field of the PPDU according to the following Equation 7:

$$\text{Length} = \left\lceil \frac{\text{TXTIME} - T_{PREAMBLE} - T_{SIGNAL}}{4} \right\rceil \times 3 - 3 \qquad \text{Eq. 7}$$

where $T_{PREAMBLE}$ is the summation of the duration of L-STF and L-LTF, and where $T_{SIGNAL}$ is the duration of the L-SIG field.

Depending on the PPDU formats (e.g., depending on whether the PPDU was an IEEE 802.11a PPDU or IEEE 802.11p PPDU), each duration could be different. (e.g., $T_{PREAMBLE}$ $T_{SIGNAL}$ being 40 in the IEEE 802.11p PPDU or in a WAVE2 PPDU based on half-clocked transmission with a 10 MHz channel).

When a WAVE2 receiver receives a WAVE2 PPDU, it needs to derive how many OFDM data symbols, $N_{SYM}$ are in the PPDU. The number of OFDM data symbols $N_{SYM}$ in a received WAVE2 PPDU may be determined as follows. First, the number of midambles $N_{MA}$ may be calculated as shown in Equation 8:

$$N_{MA} = \begin{cases} \left\lfloor \frac{N_{SYM} - 1}{M} \right\rfloor \text{ or } \left\lceil \frac{N_{SYM}}{M} \right\rceil - 1 & \text{when Doppler information in the } PPDU \text{ indicates a midamble exists,} \\ 0 & \text{otherwise.} \end{cases} \qquad \text{Eq. 8}$$

Note that both the floor-based equation and the ceiling-based equation presented as alternative in Equation 8 produce the same value of $N_{MA}$. Once the number of midambles $N_{MA}$ is known, then the number of OFDM data symbols $N_{SYM}$ is determined according to the following Equation 9:

$$N_{SYM} = \left\lfloor \left( \frac{4 \cdot (LENGTH+3)}{3} - T_{PA} - N_{MA} T_{MA} \right) \bigg/ T_{SYM} \right\rfloor \quad \text{Eq. 9}$$

where $T_{PA}$ is the duration of a WAVE2-related preamble, described elsewhere in this document.

When one or more Midamble fields exists, in order to obtain the number of OFDM data symbols $N_{SYM}$ at the receiver, Equations 8 and 9 might be used, but there is a complication that the number of midambles $N_{MA}$ in Equation 8 is a function of the number of OFDM data symbols $N_{SYM}$. Because the number of OFDM data symbols $N_{SYM}$ in the receiver side may not be directly calculated, calculating it might increase the complexity a WAVE2 receiver, compared to a receiver that does not have to handle midambles, depending on the implementation. To reduce the complexity of a receiving device, a method for identifying the number of OFDM data symbols ($N_{SYM}$) in the received PPDU simply is desired. For example, if the number of midambles $N_{MA}$ may be determined without requiring that $N_{SYM}$ be first determined, $N_{SYM}$ may then be calculated in using Equation 9.

In embodiments, a method of identifying the number of OFDM symbols in a received WAVE2 PPDU is as disclosed below.

In a first embodiment, the number of midambles $N_{MA}$ is determined according to the following Equation 10:

$$N_{MA} = \begin{cases} \left\lfloor \dfrac{\frac{4 \cdot (LENGTH+3)}{3} - T_{PA} - T_{SYM}}{T_{MA} + M \cdot T_{SYM}} \right\rfloor & \text{when Doppler info in the PPDU indicates a midamble exists,} \\ 0 & \text{otherwise.} \end{cases} \quad \text{Eq. 10}$$

In a second embodiment, the number of midambles $N_{MA}$ is determined according to the following Equation 11:

$$N_{MA} = \begin{cases} \left\lceil \dfrac{\frac{4 \cdot (LENGTH+3)}{3} - T_{PA} - T_{SYM}(M+1)}{T_{MA} + M \cdot T_{SYM}} \right\rceil & \text{when Doppler info in the PPDU indicates a midamble exists,} \\ 0 & \text{otherwise.} \end{cases} \quad \text{Eq. 11}$$

The above equations for the number of midambles $N_{MA}$ are derived as follows: Given Equations 8 and 9, when Doppler information is set to the first state (e.g., 1), which indicates that the Midamble exists, a new equation and assumptions are employed.

Step 1) from Equation 8:

$$N_{MA} = \frac{N_{SYM} - 1 - N_0}{M}, \quad 0 \le N_0 \le (M-1)$$

Step 2) from Equation 9:

$$\frac{\left( \frac{4 \cdot (LENGTH+3)}{3} - T_{PA} - N_{MA} \times T_{MA} \right)}{T_{SYM}} = N_{SYM} + \alpha, \quad 0 \le \alpha < 1$$

Step 3) from Step 1) and Step 2):

$$\frac{4 \cdot (LENGTH+3)}{3} - T_{PA} - N_{MA} \times T_{MA} = T_{SYM}(N_{SYM} + \alpha)$$

$$\frac{4 \cdot (LENGTH+3)}{3} - T_{PA} - N_{MA} \times T_{MA} = T_{SYM}(M \cdot N_{MA} + 1 + N_0 + \alpha)$$

Leading to the following Equation 12:

$$N_{MA} = \frac{\frac{4 \cdot (LENGTH+3)}{3} - T_{PA} - T_{SYM}(1 + N_0 + \alpha)}{M \cdot T_{SYM} + T_{MA}} \quad \text{Eq. 12}$$

Step 4) from Equation 12, Step 1) and Step 2), find a minimum value (lower boundary) and maximum value (upper boundary) of $N_{MA}$ as shown below:

Assuming $\alpha = 0, n_0 = 0$, $$\text{Upper } N_{MA} = \frac{\frac{4 \cdot (LENGTH+3)}{3} - T_{PA} - T_{SYM}}{M \cdot T_{SYM} + T_{MA}},$$

Assuming $\alpha = 1, n_0 = M - 1$, $$\text{Lower } N_{MA} = \frac{\frac{4 \cdot (LENGTH+3)}{3} - T_{PA} - T_{SYM}(1 + M)}{M \cdot T_{SYM} + T_{MA}},$$

$$\frac{\frac{4 \cdot (LENGTH+3)}{3} - T_{PA} - T_{SYM}(1 + M)}{M \cdot T_{SYM} + T_{MA}} <$$

$$N_{MA} \le \frac{\frac{4 \cdot (LENGTH+3)}{3} - T_{PA} - T_{SYM}}{M \cdot T_{SYM} + T_{MA}}$$

Step 5) check (UpperN$_{MA}$−LowerN$_{MA}$) to see the range of $N_{MA}$ $$\text{UpperN}_{MA} - \text{LowerN}_{MA} = \frac{M \cdot T_{SYM}}{T_{MA} + M \cdot T_{SYM}} < 1$$

Because $0 < \text{UpperN}_{MA} - \text{LowerN}_{MA} < 1$, floor (UpperN$_{MA}$)=ceil (LowerN$_{MA}$).

Accordingly, since $N_{MA}$ must be an integer greater than or equal to zero, $$N_{MA} = \left\lfloor \frac{\frac{4 \cdot (LENGTH+3)}{3} - T_{PA} - T_{SYM}}{M \cdot T_{SYM} + T_{MA}} \right\rfloor = \left\lceil \frac{\frac{4 \cdot (LENGTH+3)}{3} - T_{PA} - T_{SYM}(1 + M)}{M \cdot T_{SYM} + T_{MA}} \right\rceil$$

Once $N_{MA}$ is derived, $N_{SYM}$ can be calculated with Equation 9.

The equations above can be generalized to apply to embodiments where some number of last OFDM data symbols do not need newly updated channel information, such as the third data field 904-3 illustrated in FIG. 9. The analysis begins with the Equations 13 and 14 for determining the number of midambles $N_{MA}$ and the number of data symbols $N_{SYM}$:

$$N_{MA} = \begin{cases} \left\lceil \frac{N_{SYM} - (\beta - 1)}{M} \right\rceil - 1 & \text{when Doppler information indicates a midamble exists,} \\ 0 & \text{otherwise.} \end{cases} \quad \text{Eq. 13}$$

$$N_{SYM} = \left\lfloor \left( \frac{4 \cdot (\text{LENGTH} + 3)}{3} - T_{PA} - N_{MA} \times T_{MA} \right) / T_{SYM} \right\rfloor \quad \text{Eq. 14}$$

wherein $1 \le \beta \le M$ is the maximum number of OFDM data symbols beyond M that can be in the final data field, and the other variables are as described in the preceding analysis. In an illustrative embodiment, $\beta = 2$.

As in the preceding analysis, these equations face the complication that they depend on each other's results. Furthermore, depending on new features adopted into the WAVE2 standard, there might exist ambiguity issues in the calculation of the number of OFDM symbols in a received PPDU. For example, given different GIs, and/or the use of LDPC, and or the use of Space-Time Block Coding (STBC), $N_{SYM,final}$ may need to be determined to resolve an ambiguity correctly, where $N_{SYM,final} = N_{SYM} - (a+b+c)$, and where a, b, and c are values corresponding to GI, LDPC, and STBC, respectively.

In embodiments, a method of identifying the number of OFDM symbols in a received WAVE2 PPDU is as disclosed below:

In a first embodiment, the number of midambles $N_{MA}$ is determined according to the following Equation 15:

$$N_{MA} = \begin{cases} \left\lceil \frac{\frac{4 \cdot (\text{LENGTH} + 3)}{3} - T_{PA} - T_{SYM} \cdot \beta}{T_{MA} + M \cdot T_{SYM}} \right\rceil & \text{when Doppler info in the PPDU indicates a midamble exists,} \\ 0 & \text{otherwise.} \end{cases} \quad \text{Eq. 15}$$

In a second embodiment, the number of midambles $N_{MA}$ is determined according to the following equation:

$$N_{MA} = \begin{cases} \left\lceil \frac{\frac{4 \cdot (\text{LENGTH} + 3)}{3} - T_{PA} - T_{SYM}(M + \beta)}{T_{MA} + M \cdot T_{SYM}} \right\rceil & \text{when Doppler info in the PPDU indicates a midamble exists,} \\ 0 & \text{otherwise.} \end{cases} \quad \text{Eq. 16}$$

The equations for the number of midambles $N_{MA}$ above is derived as follows: Given Equations 13 and 14, when Doppler information is set to the first state (e.g. 1) which indicates that the midamble exists, a new equation and set of assumptions are employed:

Step 1) from Equations 13:

$$N_{MA} = \frac{N_{SYM} - (\beta - 1) + N_0}{M} - 1, \; 0 \le N_0 \le (M - 1)$$

Step 2) from Equation 14:

$$\frac{\left( \frac{4 \cdot (\text{LENGTH} + 3)}{3} - T_{PA} - N_{MA} \times T_{MA} \right)}{T_{SYM}} = N_{SYM} + \alpha, \; 0 \le \alpha < 1$$

Step 3) from Step 1) and Step 2)

$$\frac{4 \cdot (\text{LENGTH} + 3)}{3} - T_{PA} - N_{MA} \times T_{MA} = T_{SYM}(N_{SYM} + \alpha)$$

$$\frac{4 \cdot (\text{LENGTH} + 3)}{3} - T_{PA} - N_{MA} \times T_{MA} =$$
$$T_{SYM}(M \cdot N_{MA} + M + (\beta - 1) - N_0 + \alpha)$$

Leading to the following equation:

$$N_{MA} = \frac{\frac{4 \cdot (\text{LENGTH} + 3)}{3} - T_{PA} - T_{SYM}(M + (\beta - 1) - N_0 + \alpha)}{M \cdot T_{SYM} + T_{MA}} \quad \text{Eq. 17}$$

Step 4) from this and step 1) and Step 2), find a minimum value (lower boundary) and maximum value (upper boundary) of $N_{MA}$ as below:

Assuming $\alpha = 0$, $n_0 = M - 1$, $$\text{Upper } N_{MA} = \frac{\frac{4 \cdot (\text{LENGTH} + 3)}{3} - T_{PA} - T_{SYM} \cdot \beta}{M \cdot T_{SYM} + T_{MA}},$$

Assuming $\alpha = 1$, $n_0 = 0$, $$\text{Lower } N_{MA} = \frac{\frac{4 \cdot (\text{LENGTH} + 3)}{3} - T_{PA} - T_{SYM}(M + \beta)}{M \cdot T_{SYM} + T_{MA}},$$

-continued $$\frac{\frac{4 \cdot (\text{LENGTH} + 3)}{3} - T_{PA} - T_{SYM}(M + \beta)}{M \cdot T_{SYM} + T_{MA}} <$$

-continued $$N_{MA} \leq \frac{\frac{4 \cdot (\text{LENGTH}+3)}{3} - T_{PA} - T_{SYM} \cdot \beta}{M \cdot T_{SYM} + T_{MA}}$$

Step 5) check (UpperN$_{MA}$–LowerN$_{MA}$) to see the range of N$_{MA}$ $$\text{UpperN}_{MA} - \text{LowerN}_{MA} = \frac{M \cdot T_{SYM}}{T_{MA} + M \cdot T_{SYM}} < 1$$

Because 0<UpperN$_{MA}$–LowerN$_{MA}$<1, floor (UpperN$_{MA}$)=ceil (LowerN$_{MA}$). Accordingly, since N$_{MA}$ must be an integer greater than or equal to zero, $$N_{MA} = \left\lfloor \frac{\frac{4 \cdot (\text{LENGTH}+3)}{3} - T_{PA} - T_{SYM} \cdot \beta}{M \cdot T_{SYM} + T_{MA}} \right\rfloor =$$

$$\left\lceil \frac{\frac{4 \cdot (\text{LENGTH}+3)}{3} - T_{PA} - T_{SYM}(M+\beta)}{M \cdot T_{SYM} + T_{MA}} \right\rceil$$

Once N$_{MA}$ is derived, N$_{SYM}$ can be calculated with Equation 14.

For example, given β=2, the number of midambles N$_{MA}$ being 0 or a positive integer according to the definition, a midamble is inserted every M OFDM data symbols except in two cases: there is no midamble inserted after the last data OFDM symbol if mod(N$_{SYM}$, M)=0, and at the end of a PPDU, if mod(N$_{SYM}$, M)≤β−1, there is also no midamble field inserted before the last (β−1) OFDM data symbol(s).

In embodiments, depending on new features to be added for WAVE2, there might exist ambiguity issues on the number of OFDM symbols to calculate from the received PPDU. For example, given different GIs, LDPC, and/or STBC, N$_{SYM,final}$ may need to be further considered such as N$_{SYM,final}$=N$_{SYM}$–a–b–c where a, b and c are values corresponding to GI, LDPC and STBC, respectively in case there is ambiguity issues to get N$_{SYM}$ correctly.

With different approaches, in order to find the number of OFDM symbols in a received PPDU, we need to take a look at corresponding equations as below.

The number of midambles N$_{MA}$ may be according to Equation 8, above. The number of OFDM data symbols N$_{SYM}$ may be calculated according to Equation 18 below, wherein RXTIME is a receive time that is calculated according to Equation 19 below:

$$N_{SYM} = \lfloor (RXTIME - T_{L-STF} - T_{LTF} - T_{L-SIG} - T_{PA} - N_{MA} \times T_{MA})/T_{SYM} \rfloor \quad \text{Eq. 18}$$

$$RXTIME = \left\lceil \frac{\text{LENGTH}+3}{3} \right\rceil \cdot 4 + T_{L-STF} + T_{L-LTF} + T_{L-SIG} \quad \text{Eq. 19}$$

This leads to Equation 9, above.

When a midamble field exists, in order to obtain N$_{SYM}$ at the receiver, Equation 9 should be generally used, but as previously described, this is problematic because N$_{MA}$ in Equation 9 is a function of N$_{SYM}$ again. It would be advantageous, as previously described, to have a way to determine the number of midambles N$_{MA}$ without having to first determine the number of OFDM data symbols N$_{SYM}$. Once N$_{MA}$ is determined, N$_{SYM}$ is calculated directly using Equation 18.

In embodiments, a method of determining the number of OFDM data symbols in a received WAVE2 PPDU is as disclosed below.

In a first embodiment, the number of midambles N$_{MA}$ corresponds to Equation 10, above. In a second equivalent embodiment equivalent to the first embodiment, the number of midambles N$_{MA}$ corresponds to Equation 11, above. Accordingly, the number of midambles N may be derived as follows.

Pursuant to Equations 10 and 11, when Doppler information is set to the first state (e.g. 1), which indicates that one or more midambles exists, the following equations and set of assumptions are used:

Step 1) from Equations 8:

$$N_{MA} = \frac{N_{SYM} - 1 - N_0}{M}, 0 \leq N_0 \leq (M-1) \xrightarrow{yields} N_{SYM} = M \cdot N_{MA} + 1 + N_0$$

Step 2) from Equation 9:

$$\frac{\left(\frac{4 \cdot (\text{LENGTH}+3)}{3} - T_{PA} - N_{MA} \times T_{MA}\right)}{T_{SYM}} = N_{SYM} + \alpha, 0 \leq \alpha < 1$$

Step 3) from Step 1) and Step 2)

$$\left\lceil \frac{\text{LENGTH}+3}{3} \right\rceil \cdot 4 - T_{PA} - N_{MA} \times T_{MA} = T_{SYM}(N_{SYM} + \alpha)$$

$$\left\lceil \frac{\text{LENGTH}+3}{3} \right\rceil \cdot 4 - T_{PA} - N_{MA} \times T_{MA} = T_{SYM}(M \cdot N_{MA} + 1 + N_0 + \alpha)$$

which yields the following Equation 20:

$$N_{MA} = \frac{\left\lceil \frac{\text{LENGTH}+3}{3} \right\rceil \cdot 4 - T_{PA} - T_{SYM}(1 + N_0 + \alpha)}{M \cdot T_{SYM} + T_{MA}} \quad \text{Eq. 20}$$

Step 4) from this Equation 20, Step 1), and Step 2), find a minimum value (lower boundary) and a maximum value (upper boundary) of N$_{MA}$ to find the boundary as below.

Assuming $\alpha = 0, n_0 = 0$, $$\text{Upper } N_{MA} = \frac{\left\lceil \frac{\text{LENGTH}+3}{3} \right\rceil \cdot 4 - T_{PA} - T_{SYM}}{M \cdot T_{SYM} + T_{MA}}$$

Assuming $\alpha = 1, n_0 = M - 1$, $$\text{Lower } N_{MA} = \frac{\left\lceil \frac{\text{LENGTH}+3}{3} \right\rceil \cdot 4 - T_{PA} - T_{SYM}(1+M)}{M \cdot T_{SYM} + T_{MA}}$$

$$\frac{\left\lceil \frac{\text{LENGTH}+3}{3} \right\rceil \cdot 4 - T_{PA} - T_{SYM}(1+M)}{M \cdot T_{SYM} + T_{MA}} <$$

$$N_{MA} \leq \frac{\left\lceil \frac{LENGTH+3}{3} \right\rceil \cdot 4 - T_{PA} - T_{SYM}}{M \cdot T_{SYM} + T_{MA}}$$

Step 5) check (Upper $N_{MA}$–Lower $N_{MA}$) to see the range of $N_{MA}$ $$UpperN_{MA} - LowerN_{MA} = \frac{M \cdot T_{SYM}}{T_{MA} + M \cdot T_{SYM}} < 1$$

Because $0 < UpperN_{MA} - LowerN_{MA} < 1$, floor $(UpperN_{MA})$=ceil $(LowerN_{MA})$. Accordingly, since $N_{MA}$ must be an integer greater than or equal to zero, $$N_{MA} = \left\lfloor \frac{\left\lceil \frac{LENGTH+3}{3} \right\rceil \cdot 4 - T_{PA} - T_{SYM}}{M \cdot T_{SYM} + T_{MA}} \right\rfloor =$$

$$\left\lfloor \frac{\left\lceil \frac{LENGTH+3}{3} \right\rceil \cdot 4 - T_{PA} - T_{SYM}(1+M)}{M \cdot T_{SYM} + T_{MA}} \right\rfloor$$

Once $N_{MA}$ is derived, $N_{SYM}$ can be calculated with Equation 9.

In addition, in embodiments, depending on new features to be added for WAVE2, there might exist ambiguity issues on the number of OFDM symbols to calculate from the received PPDU, as discussed above.

In an embodiment, a method of identifying the number of OFDM symbols in a received WAVE2 PPDU is as disclosed below.

In a first embodiment, the number of midambles $N_{MA}$ corresponds to Equation 15, above. In another equivalent embodiment, the number of midambles $N_{MA}$ corresponds to Equation 16, above. Accordingly, the number of midambles $N_{MA}$ may be derived as follows: Given equations 15 and 16, when Doppler information is set to the first state (e.g. 1) which indicates that the Midamble exists, a new equation and assumptions are employed:

Step 1) from Equations 13:

$$N_{MA} = \frac{N_{SYM} - (\beta - 1) + N_0}{M} - 1,$$

$$0 \leq N_0 \leq (M-1) \xrightarrow{yields} N_{SYM} = M \cdot N_{MA} + (\beta - 1) + N_0$$

Step 2) from Equation 14:

$$\frac{\left( \frac{4(LENGTH+3)}{3} - T_{PA} - N_{MA} \times T_{MA} \right)}{T_{SYM}} = N_{SYM} + \alpha, 0 \leq \alpha < 1$$

Step 3) from Step 1) and Step 2):

$$\left\lceil \frac{LENGTH+3}{3} \right\rceil \cdot 4 - T_{PA} - N_{MA} \times T_{MA} = T_{SYM}(N_{SYM} + \alpha)$$

$$\left\lceil \frac{LENGTH+3}{3} \right\rceil \cdot 4 - T_{PA} - N_{MA} \times T_{MA} =$$

$$T_{SYM}(M \cdot N_{MA} + M + (\beta - 1) - N_0 + \alpha)$$

Leading to the following Equation 21:

$$N_{MA} = \frac{\left\lceil \frac{LENGTH+3}{3} \right\rceil \cdot 4 - T_{PA} - T_{SYM}(M + (\beta - 1) - N_0 + \alpha)}{M \cdot T_{SYM} + T_{MA}} \quad \text{Eq. 21}$$

Step 4) from this Equation 21, Step 1), and Step 2), find a minimum value (lower boundary) and a maximum value (upper boundary) of $N_{MA}$ as below.

Assuming $\alpha = 0$, $n_0 = M - 1$, $$\text{Upper } N_{MA} = \frac{\left\lceil \frac{LENGTH+3}{3} \right\rceil \cdot 4 - T_{PA} - T_{SYM} \cdot \beta}{M \cdot T_{SYM} + T_{MA}}$$

Assuming $\alpha = 1$, $n_0 = 0$, $$\text{Lower } N_{MA} = \frac{\left\lceil \frac{LENGTH+3}{3} \right\rceil \cdot 4 - T_{PA} - T_{SYM}(M + \beta)}{M \cdot T_{SYM} + T_{MA}}$$

$$\frac{\left\lceil \frac{LENGTH+3}{3} \right\rceil \cdot 4 - T_{PA} - T_{SYM}(M + \beta)}{M \cdot T_{SYM} + T_{MA}} <$$

$$N_{MA} \leq \frac{\left\lceil \frac{LENGTH+3}{3} \right\rceil \cdot 4 - T_{PA} - T_{SYM} \cdot \beta}{M \cdot T_{SYM} + T_{MA}}$$

Step 5) check (UpperN$_{MA}$–LowerN$_{MA}$) to see the range of $N_{MA}$ $$UpperN_{MA} - LowerN_{MA} = \frac{M \cdot T_{SYM}}{T_{MA} + M \cdot T_{SYM}} < 1$$

Because $0 < UpperN_{MA} - LowerN_{MA} < 1$, floor $(UpperN_{MA})$=ceil $(LowerN_{MA})$. Accordingly, since $N_{MA}$ must be an integer greater than or equal to zero, $$N_{MA} = \left\lfloor \frac{\left\lceil \frac{LENGTH+3}{3} \right\rceil \cdot 4 - T_{PA} - T_{SYM} \cdot \beta}{M \cdot T_{SYM} + T_{MA}} \right\rfloor =$$

$$\left\lfloor \frac{\left\lceil \frac{LENGTH+3}{3} \right\rceil \cdot 4 - T_{PA} - T_{SYM}(M + \beta)}{M \cdot T_{SYM} + T_{MA}} \right\rfloor$$

Once $N_{MA}$ is derived, $N_{SYM}$ can be calculated with Equation 14.

For example, given $\beta=2$, the number of midambles $N_{MA}$ being 0 or a positive integer according to the definition, a midamble is inserted every M OFDM data symbols except in two cases: there is no midamble inserted after the last data OFDM symbol if mod($N_{SYM}$, M)=0, and at the end of a PPDU, if mod($N_{SYM}$, M)≤β−1, there is also no midamble field inserted before the last (β−1) OFDM data symbol(s).

In embodiments, depending on new features to be added for WAVE2, there might exist ambiguity issues on the number of OFDM symbols to calculate from the received PPDU. For example, given different GIs, LDPC and/or STBC, $N_{SYM,final}$ may need to be further considered such as $N_{SYM,final}=N_{SYM}-a-b-c$ where a, b, and c are values corresponding to GI, LDPC and STBC, respectively in case there is ambiguity issues to get $N_{SYM}$ correctly.

In another embodiment, a receive time RXTIME for a WAVE2 PPDUs should comply with the 4 μs boundary rule wherein the value of RXTIME is indicated in units of 4 μs in order to give fair opportunity for legacy IEEE 802.11p devices to compete for medium access with WAVE2 devices. The WAVE2 preamble duration $T_{PA}$, symbol duration $T_{SYM}$, and midamble duration $T_{MA}$ may not be in units of 4 μs depending on value of GI or whether a compressed WAVE2 LTF is used (e.g., a 1×WAVE2-LTF or 2×WAVE2-LTF, respectively equivalent to modulating every 4 or 2 tones in an OFDM symbol of non-compressed WAVE2 LTF), The receive time RXTIME may be determined by Equation 22 below:

$$RXTIME = T_{PREAMBLE} + T_{SIGNAL} + T_{WAVE2-SIG(s)} + 4 \times \left[ \frac{T_{WAVE2\_PREAMBLE} + N_{SYM}T_{SYM} + N_{MA}T_{MA}}{4} \right] \quad \text{Eq. 22}$$

where $T_{WAVE2-SIG(S)}$ is a duration of the WAVE2 SIG field(s) OFDM symbol(s), and $T_{WAVE2-PREAMBLE}=T_{WAVE2-STF}+N \cdot T_{WAVE2-LTF}$, N=number of WAVE2-LTF OFDM symbols.

Depending on WAVE2 PPDU format, the WAVE2 preamble duration $T_{PA}$ in equations above may be differently defined. Some examples are explained in this invention while omitting the mathematical details but repeating how to determine $N_{MA}$ or $N_{SYM}$ at a receiver.

In the embodiment of FIG. 10, a WAVE2 PPDU 1000 starts with a legacy preamble identical to that of an IEEE 802.11p PPDU with L-STF and L-LTF, followed by an 802.11p L-SIG field. The WAVE2 PPDU then includes a WAVE2 SIG field and a DATA field, with an OFDM numerology according to the 802.11a 20 MHz numerology, downclocked by 2 with 156.25 kHz subcarrier spacing. Downclocking results in the rate of OFDM symbol transmissions to be reduced, lengthening the OFDM symbol duration, which reduces the spacing between carriers and therefore reduces the bandwidth used to transmit the OFDM symbol. The duration and NSD (number of data subcarriers) of each WAVE2 OFDM symbol is therefore the same 8 us and 48 data subcarriers, respectively, of an IEEE 802.11p OFDM symbol. Thus, an extension of IEEE 802.11p is used for the design of the WAVE2 PPDU.

Figure 12A:
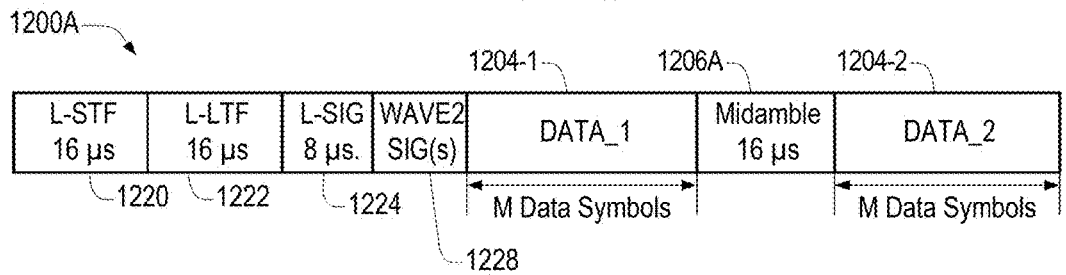
FIG. 12A illustrates a PPDU, including a midamble, according to an embodiment.

FIG. 12A illustrates a WAVE2 PPDU 1200A according to an embodiment. The WAVE2 PPDU 1200A includes an L-STF 1220, an L-LTF 1222, an L-SIG field 1224, first and second data fields 1204-1 and 1204-2, and a midamble 1206A. Unless indicated otherwise, each of the fields of the WAVE2 PPDU 1200A are substantially similar to the corresponding fields in the WAVE2 PPDU 1000 of FIG. 10, and description thereof are therefore omitted in the interest of brevity.

In the WAVE2 PPDU 1200A, an IEEE 802.11p L-LTF symbol is reused for midambles, such as the midamble 1206A. Midambles are inserted every M OFDM data symbols, M being a predetermined midamble periodicity. In the WAVE2 PPDU 1200A, the WAVE2 preamble duration of the $T_{PA}=T_{WAVE2\_SIG(s)}$. The midamble 1206A has a duration equal to the L-LTF field 1222, i.e., 16 μs.

Figure 12B:
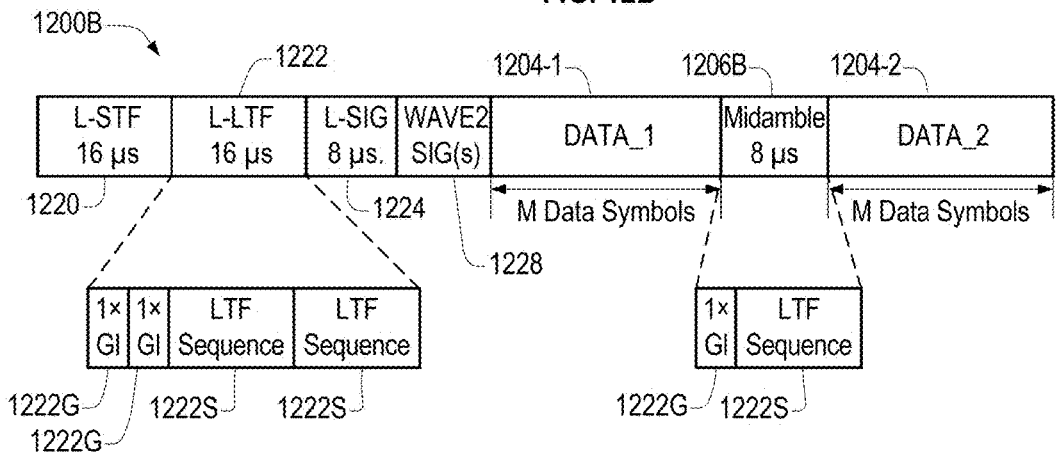
FIG. 12B illustrates a PPDU, including a midamble, according to another embodiment.

FIG. 12B illustrates a WAVE2 PPDU 1200B according to an embodiment. Unless indicated otherwise, each of the fields of the WAVE2 PPDU 1200B are substantially similar to the corresponding fields in the WAVE2 PPDU 1200A of FIG. 12A, and description thereof are therefore omitted in the interest of brevity.

The WAVE2 PPDU 1200B differs from the WAVE2 PPDU 1200A in that the midamble 1206B has a duration of only 8 μs. The midamble 1206B may include one Guard Interval (GI) 1222G and one LTF Sequence 1222S; in contrast, the L-LTF 1222 includes two GIs 1222G followed by two LTF sequences 1222S. The midamble 1206A of FIG. 12A may be two 8 μs OFDM symbols in length; in contrast, the midamble 1206B may be one 8 μs OFDM symbol in length.

Figure 13A:
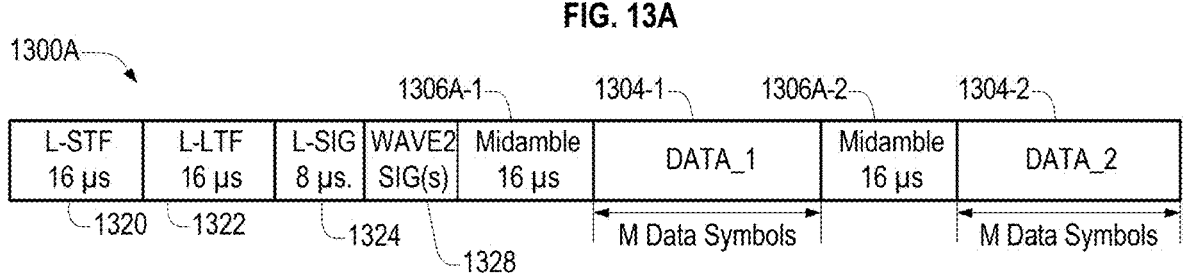
FIG. 13A illustrates a PPDU, including a midamble, according to another embodiment.

FIG. 13A illustrates a WAVE2 PPDU 1300A, according to another embodiment. The WAVE2 PPDU 1300A includes an L-STF 1320, an L-LTF 1322, an L-SIG field 1324, a WAVE2 SIG field 1328, first and second data fields 1304-1 and 1304-2, and first and second midambles 1306A-1 and 1306A-2. Unless indicated otherwise, each of the fields of the WAVE2 PPDU 1300A is substantially similar to the corresponding fields in the WAVE2 PPDU 1200A of FIG. 12A, and description thereof are therefore omitted in the interest of brevity.

The WAVE2 PPDU 1300A is suitable for environments with particularly severe Doppler effects. Accordingly, the WAVE2 PPDU 1300A instead includes a first midamble 1306A-1 inserted before the first OFDM data symbol, and a second midamble 1306A-2 inserted after the $M^{th}$ OFDM data symbol. The first and second midambles 1306A-1 and 1306A-2 reuse IEEE 802.11p L-LTF symbols, and in the WAVE2 PPDU 1300A the WAVE2 preamble duration $T_{PA}=T_{WAVE2\_SIG(s)}+T_{L-LTF}$.

Figure 13B:
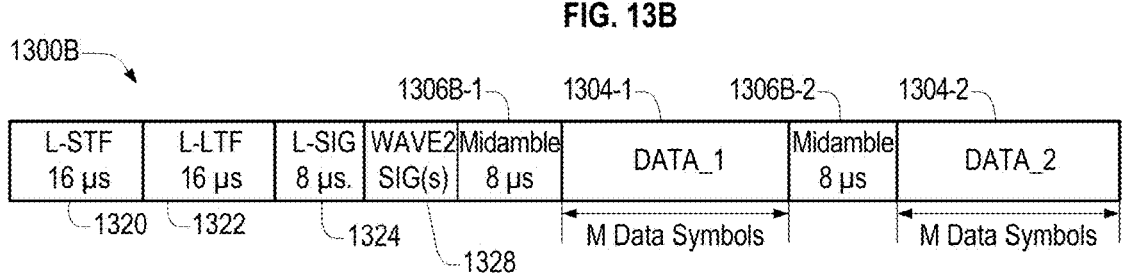
FIG. 13B illustrates a PPDU, including a midamble, according to another embodiment.

FIG. 13B illustrates a WAVE2 PPDU 1300B, according to another embodiment. Unless indicated otherwise, each of the fields of the WAVE2 PPDU 1300B are substantially similar to the corresponding fields in the WAVE2 PPDU 1300A of FIG. 13A, and description thereof are therefore omitted in the interest of brevity.

The WAVE2 PPDU 1300B differs from the WAVE2 PPDU 1300A in that the first and second midambles 1306B-1 and 1300B-2 each have a duration of only 8 μs, and are each constructed in the same manner as the midamble 1206B of FIG. 12B. In the WAVE2 PPDU 1300B the WAVE2 preamble duration $T_{PA}=T_{WAVE2\_SIG(s)}+T_{L-LTF}/2$.

FIG. 14 illustrates a WAVE2 PPDU 1400, according to another embodiment. The WAVE2 PPDU 1400 includes an L-STF 1420, an L-LTF 1422, an L-SIG field 1424, a WAVE2 SIG field 1428, and a data field 1426. Unless indicated otherwise, each of the fields of the WAVE2 PPDU 1400 are substantially similar to the corresponding fields in the WAVE2 PPDU 1200A of FIG. 12A, and description thereof are therefore omitted in the interest of brevity.

The WAVE2 PPDU 1400 provides better OFDM efficiency by using extra tones not used by IEEE 802.11p PPDUs to improve the Peak-to-Average Power Ratio (PAPR) of the L-SIG field 1424, and to increase the amount of data carried in each OFDM data symbol of the data field 1426. The WAVE2 PPDU 1400 may use, for the fields following the L-SIG field 1424, an OFDM tone plan equivalent to an IEEE 802.11ac 20 MHz tone plan downclocked by 2, an IEEE 802.11ac 40 MHz tone plan downclocked by 4, or an IEEE 802.11ac 80 MHz tone plan downclocked by 8.

This would give the fields after the L-SIG field 1424 52 data subcarriers instead of 48 as in IEEE 802.11p.

In order to measure the channel for those extra tones, extra tones are added somewhere before fields with additional tones: here, to the L-SIG field 1424 in the form of upper and lower L-SIG extra tones 1432H and 1432L. In an embodiment, the upper L-SIG extra tones 1432H include subcarriers with indexes of 27 and 28, and the lower L-SIG extra tones 1432L include subcarriers with indexes of −27 and −28.

The WAVE2 PPDU 1400 starts with an IEEE 802.11p legacy preamble, including the L-STF 1420, the L-LTF 1422, and the L-SIG field 1424, which use the IEEE 802.11p OFDM numerology. The legacy preamble is followed by the WAVE2 SIG field 1428 and the DATA field 1426 using a WAVE2 OFDM numerology different from the IEEE 802.11p OFDM numerology. The second WAVE2 OFDM numerology could be an IEEE 802.11ac 20 MHz numerology downclocked by 2 with 156.25 kHz subcarrier spacing, an IEEE 802.11ac 40 MHz numerology downclocked by 4 with 78.125 kHz subcarrier spacing, or an IEEE 802.11ac 80 MHz numerology downclocked by 8 with 39.0625 kHz subcarrier spacing. In another embodiment, the WAVE2 OFDM numerology could be based on downclocking an IEEE 802.11ax numerology. With extra tones added to the WAVE2 SIG field 1428 and DATA field 1426, these fields may carry additional information in each of their OFDM symbols.

The upper and lower L-SIG extra tones 1432H and 1432L used for channel estimation may have include a sequence designed to minimize the expected PAPR of the L-SIG field 1424. FIGS. 16 and 17 include tables 3 and 4 showing potential sequences for use in the upper and lower L-SIG extra tones 1432H and 1432L, and the expected maximum PAPR for that field in 99.9% (Table 3) and 99% (Table 4) of the possible values for the L-SIG field 1424. Tables 3 and 4 were determined by assuming the extra tones are either {+1 or −1} BPSK constellation values and measuring the peak power to average power ratio of an L-SIG OFDM symbol with the extra tones. The measurement was performed for all valid L-SIG content values for an IEEE 802.11p PPDU. A set of sequences were thereby identified for the extra tones (e.g., sequence 7, followed closely by sequences 8 and 15) that had minimal PAPR over all possible valid L-SIG contents. Respective embodiments may use sequences sequence 7, 8, or 15 for the upper and lower L-SIG extra tones 1432H and 1432L in order to reduce the PAPR of the L-SIG filed 1424.

FIG. 15 illustrates a WAVE2 PPDU 1500, according to another embodiment. The WAVE2 PPDU 1500 includes an L-STF 1520, an L-LTF 1522, an L-SIG field 1524, upper and lower L-SIG extra tones 1532H and 1532L, a WAVE2 SIG field 1528, and midamble 1506-1, and first and second data fields 1504-1 and 1504-2. Unless indicated otherwise, each of the fields of the WAVE2 PPDU 1500 are substantially similar to the corresponding fields in the WAVE2 PPDU 1400 of FIG. 14, and description thereof are therefore omitted in the interest of brevity.

The WAVE2 SIG field 1528, midamble 1506-1, and first and second data fields 1504-1 and 1504-2 use a WAVE2 OFDM numerology as described with respect to FIG. 14. The midamble 1506-1 may comprise one or more WAVE2 LTF symbols or a WAVE2 STF symbol and one or more WAVE LTF symbols, described below. The WAVE2 PPDU 1500 has a WAVE2 preamble duration $T_{PA}=T_{WAVE2\_SIG(s)}$.

FIG. 18 illustrates a WAVE2 PPDU 1800 according to another embodiment. The WAVE2 PPDU 1800 includes an L-STF 1820, an L-LTF 1822, an L-SIG field 1824, a WAVE2 SIG field 1828, a WAVE2 training field 1834, a data field 1826. Unless indicated otherwise, each of the fields of the WAVE2 PPDU 1800 are substantially similar to the corresponding fields in the WAVE2 PPDU 1500 of FIG. 15, and description thereof are therefore omitted in the interest of brevity. The WAVE2 PPDU 1800 has a WAVE2 preamble duration $T_{PA}=T_{WAVE2\_SIG(s)}(+T_{WAVE2\_STF})+T_{WAVE2\_LTF(s)}$, that is, equal to the combined durations of the WAVE2 SIG field 1828 and the WAVE2 training field 1834.

In an embodiment, the WAVE2 training field 1834 includes a WAVE2 STF symbol and one or more WAVE2 LTF symbols. In another embodiment, the WAVE2 training field 1834 includes just one or more WAVE2 LTF symbols. The WAVE2 STF/LTF symbols are designed to facilitate channel measurement for symbols using a WAVE2 OFDM methodology having more data subcarriers than an IEEE 802.11p OFDM methodology, such as described with respect to FIG. 14.

Since the WAVE2 LTF (and in an embodiment, the WAVE2 STF) can cover all subchannels of the WAVE2 OFDM numerology, including the additional tones relative to IEEE 802.11p, extra tones, such as those accompanying the L-SIG field 1524 of PPDU 1500, are not needed in the WAVE2 PPDU 1800. And while the WAVE2 portion of the PPDU is allowed to carry extra data information, the WAVE2 SIG field 1828 here uses only the 48 data subcarriers used by the L-SIG field 1524. If control information for the WAVE2 PPDU is small enough to carry in 48 data subcarriers, this PPDU structure works without additional work to handle extra tones.

FIG. 19 illustrates a WAVE2 PPDU 1900 according to another embodiment. The WAVE2 PPDU 1900 includes an L-STF 1920, an L-LTF 1922, an L-SIG field 1924, a WAVE2 SIG field 1928, a WAVE2 training field 1934, a WAVE2 midamble 1936-1, and first and second data fields 1926-1 and 1926-2. Unless indicated otherwise, each of the fields of the WAVE2 PPDU 1900 are substantially similar to the corresponding fields in the WAVE2 PPDU 1800 of FIG. 18, and description thereof are therefore omitted in the interest of brevity. The WAVE2 PPDU 1900 has a WAVE2 preamble duration $T_{PA}=T_{WAVE2\_SIG(s)}(+T_{WAVE2\_STF})+T_{WAVE2\_LTF(s)}$, that is equal to the combined durations of the WAVE2 SIG field 1928 and the WAVE2 training field 1934.

In an embodiment, the WAVE2 midamble 1936-1 includes a WAVE2 STF symbol and one or more WAVE2 LTF symbols. In another embodiment, the WAVE2 midamble 1936-1 includes just one or more WAVE2 LTF symbols. The symbols of the WAVE2 midamble 1936-1 provide for channel characterization for all of the tones (subchannels) used to carry data in the second data field 1926-2.

FIG. 20 illustrates a WAVE2 PPDU 2000 according to another embodiment. The WAVE2 PPDU 2000 includes an L-STF 2020, an L-LTF 2022, an L-SIG field 2024, a WAVE2 training field 2034, a WAVE2 SIG field 2028, and a data field 2026. Unless indicated otherwise, each of the fields of the WAVE2 PPDU 2000 are substantially similar to the corresponding fields in the WAVE2 PPDU 1800 of FIG. 18, and description thereof are therefore omitted in the interest of brevity. The WAVE2 PPDU 2000 has a WAVE2 preamble duration $T_{PA}=T_{WAVE2\_SIG(s)}(+T_{WAVE2\_STF})+T_{WAVE2\_LTF(s)}$, that is equal to the combined durations of the WAVE2 SIG field 2028 and the WAVE2 training field 2034.

The WAVE2 PPDU 2000 differs from the WAVE2 PPDU 1800 in having the WAVE2 training field 2034 precede the WAVE2 SIG field 2028. Accordingly, the WAVE2 training field 2034 permits channel characterization for all the data tones (subcarriers) in the WAVE2 OFDM numerology. This permits the WAVE2 SIG field 2028 to use more data tones (e.g. 52 instead of 48) and thereby carry more information per OFDM symbol, and allows the channel conditions for the additional tones (relative to IEEE 802.11p) used in the OFDM symbols of the data field 2026 to be determined.

FIG. 21 illustrates a WAVE2 PPDU 2100 according to another embodiment. The WAVE2 PPDU 2100 includes an L-STF 2120, an L-LTF 2122, an L-SIG field 2124, a WAVE2 training field 2134, a WAVE2 SIG field 2128, a WAVE2 midamble 2136-1, and first and second data fields 2126-1 and 2126-2. Unless indicated otherwise, each of the fields of the WAVE2 PPDU 2100 are substantially similar to the corresponding fields in the WAVE2 PPDU 1900 of FIG. 19, and description thereof are therefore omitted in the interest of brevity. The WAVE2 PPDU 2100 has a WAVE2 preamble duration $T_{PA}=T_{WAVE2\_SIG(s)}(+T_{WAVE2\_STF})+T_{WAVE2\_LTF(s)}$, that is equal to the combined durations of the WAVE2 SIG field 2128 and the WAVE2 training field 2134.

The WAVE2 PPDU 2100 differs from the WAVE2 PPDU 1900 in having the WAVE2 training field 2134 precede the WAVE2 SIG field 2128. Accordingly, the WAVE2 training field 2134 permits channel characterization for all the data tones (subcarriers) in the WAVE2 OFDM numerology. This permits the WAVE2 SIG field 2128 to use more data tones (e.g. 52 instead of 48) and thereby carry more information per OFDM symbol, and allows the channel conditions for the additional tones (relative to IEEE 802.11p) used in the OFDM symbols of the first data field 2026-1 to be determined.

In an embodiment of the invention, if several modes are supported in the WAVE2 standard, a WAVE2 PPDU contains a first information to indicate the specific PPDU formation for a receiver. The first information could be in the legacy preamble of the WAVE2 PPDU.

In an illustrative embodiment, the L-SIG field includes the first information. For example, a value of the LENGTH field of the L-SIF field modulo 3 being 1 or 2 could indicate which of a plurality of WAVE2 PPDU types the WAVE2 PPDU was.

In an illustrative embodiment, the first information could be in Media Access Control (MAC) part. For example, some of reserved bits in the Duration/ID field of a MAC header carried in a PSDU could be used to indicate the WAVE2 PPDU format.

The Duration/ID field above is 16 bits in length. The contents of this field vary with frame type and subtype, and with the QoS capabilities of the sending STA. The contents of the field are defined differently depending on the frame types. For a frame type carried by a WAVE2 PPDU, the Duration/ID field could be interpreted as shown by Table 5 of FIG. 22.

Embodiments disclosed herein provide for more reliable DSRC and/or V2X communications in the presence of strong Doppler effects. Embodiments enhance the efficiency of communication of DSRC and/or V2X communications by allowing more tones to be used to carry information while preserving backward compatibility with IEEE 802.11p based systems. Embodiments provide for fair media access when devices operating according to a WAVE2 standard compete for access with devices operating according to the IEEE 802.11p standard.

What is claimed is:

1. A method performed by a wireless device, the method comprising:
receiving a first portion of a Physical Layer Protocol Data Unit (PPDU), the first portion including a Legacy Signal (L-SIG) field and a second signal field, the second signal field being received after the reception of the L-SIG field, and the L-SIG field includes a Length field with a value of LENGTH;
decoding, using first information in the L-SIG field, the second signal field;
determining, using second information included in the second signal field, that the PPDU includes midambles;
in response to determining that the PPDU includes midambles:
determining, using a midamble periodicity M, a number of midambles $N_{MA}$ in the PPDU,
determining, using the number of midambles, a number of data symbols in a data field of the PPDU, and
processing, using the number of midambles and the number of data symbols, the data field of the PPDU,
wherein determining the number of midambles $N_{MA}$ includes determining the number of midambles $N_{MA}$ according to:

$$N_{MA} = \left\lfloor \frac{\frac{X \cdot (\text{LENGTH}+3)}{3} - T_{PA} - T_{SYM} \cdot \beta}{T_{MA} + M \cdot T_{SYM}} \right\rfloor$$

or according to:

$$N_{MA} = \left\lfloor \frac{\frac{X \cdot (\text{LENGTH}+3)}{3} - T_{PA} - T_{SYM}(M+\beta)}{T_{MA} + M \cdot T_{SYM}} \right\rfloor$$

wherein $T_{PA}$ is a duration of a preamble, the preamble including the second signal field, $T_{MA}$ is a duration of a midamble, $T_{SYM}$ is a duration of the data symbols of the data field, $\beta$ is a predetermined integer number greater than or equal to one, and X is a positive integer value.

2. The method of claim 1, wherein the second information includes an indication having a first state when the PPDU does not include midambles and a second state when the PPDU includes midambles.

3. The method of claim 2, wherein the second information further includes an indication of the midamble periodicity M.

4. The method of claim 2, wherein the midamble periodicity M is a predetermined number.

5. The method of claim 1, wherein $\beta$ is one of 1, 2, or 4.

6. The method of claim 1, wherein receiving the data field comprises:
receiving a plurality of consecutive data symbols equal to the midamble periodicity M;
receiving a midamble immediately following the plurality of consecutive data symbols;
characterizing the channel using the midamble; and
receiving one or more remaining consecutive data symbols using the results of characterizing the channel using the midamble.

7. The method of claim 6, wherein a total number of subcarriers used to carry information in a data symbol is greater than a total number of subcarriers used to carry information in a symbol of the L-SIG field, and
wherein the midamble permits channel characterization for every subcarrier used to carry information in the data symbol.

8. A wireless device comprising:
a receiver; and
a processor, the processor configured to perform:
receiving, using the receiver, a first portion of a Physical Layer Protocol Data Unit (PPDU), the first portion including a Legacy Signal (L-SIG) field and a second signal field, the second signal field being received after the reception of the L-SIG field;
decoding, using first information in the L-SIG field, the second signal field;
determining, using second information included the second signal field, that the PPDU includes midambles;
in response to determining that the PPDU includes midambles:
determining, using a midamble periodicity M, a number of midambles $N_{MA}$ in the PPDU,
determining, using the number of midambles, a number of data symbols in a data field the PPDU, and
processing, using the number of midambles and the number of data symbols, the data field of the PPDU,
wherein the second information includes an indication having a first state when the PPDU does not include midambles and a second state when the PPDU includes midambles,
wherein the L-SIG field includes a Length field with a value of LENGTH, and
wherein determining the number of midambles $N_{MA}$ includes determining the number of midambles $N_{MA}$ according to:

$$N_{MA} = \left\lfloor \frac{\frac{X \cdot (LENGTH+3)}{3} - T_{PA} - T_{SYM} \cdot \beta}{T_{MA} + M \cdot T_{SYM}} \right\rfloor$$

or according to:

$$N_{MA} = \left\lfloor \frac{\frac{X \cdot (LENGTH+3)}{3} - T_{PA} - T_{SYM}(M + \beta)}{T_{MA} + M \cdot T_{SYM}} \right\rfloor$$

wherein $T_{PA}$ is a duration of a preamble, the preamble including the second signal field, $T_{MA}$ is a duration of a midamble, $T_{SYM}$ is a duration of the data symbols of the data field β is a predetermined integer number greater than or equal to one, and X is a positive integer value.

9. The wireless device of claim 8, wherein β is one of 1, 2, or 4.

10. A method performed by a wireless device, the method comprising:
generating a first portion of a Physical Layer Protocol Data Unit (PPDU), the first portion including a Legacy Signal (L-SIG) field and a second signal field, the second signal field is after the L-SIG field, and the L-SIG field includes a Length field with a value of LENGTH;
determining, using a midamble periodicity M and a number of data symbols $N_{SYM}$, a number of midambles $N_{MA}$ to include in the PPDU according to:

$$N_{MA} = \lfloor (N_{SYM}-1)/M \rfloor$$

generating, using the number of midambles $N_{MA}$ and the number of data symbols $N_{SYM}$, a second portion of the PPDU, including the data field of the PPDU;
determining the value of LENGTH according to:

$$LENGTH = \left\lceil \frac{TXTIME - T_{PREAMBLE} - T_{SIGNAL}}{X} \right\rceil \times 3 - 3$$

or according to:

$$LENGTH = \frac{TXTIME - T_{PREAMBLE} - T_{SIGNAL}}{X} \times 3 - 3$$

where TXTIME is determined according to:

$$TXTIME = T_{PREAMBLE} + T_{SIGNAL} + T_{SIG(s)} + X \times \left\lceil \frac{T_{PREAMBLE2} + N_{SYM}T_{SYM} + N_{MA}T_{MA}}{X} \right\rceil$$

where $T_{PREAMBLE}$ is a summation of a duration of a legacy short training field (L-STF) and a legacy long training field (L-LTF) in the PPDU; $T_{SIGNAL}$ is a duration of the L-SIG field in the PPDU; $T_{SIG(S)}$ is a duration of symbols in a set of non-legacy signal fields in the PPDU, including the second signal field; $T_{PREAMBLE2}$ is equal to a combined duration of symbols in a non-legacy short training field (STF) and a non-legacy long training field (LTF) in the PPDU; $T_{SYM}$ is a duration of each data symbol in the PPDU; $T_{MA}$ is a duration of each midamble field in the PPDU; and X is a positive integer value; and
transmitting the PPDU on a channel to a set of wireless devices.

11. The method of claim 10, wherein the second signal field has information that includes an indication of the midamble periodicity M.

12. The method of claim 10, wherein transmitting the PPDU on the channel comprises:
transmitting a plurality of consecutive data symbols on the channel equal to the midamble periodicity M;
transmitting a midamble immediately following the plurality of consecutive data symbols on the channel, wherein the midamble is to be used by the set of stations for characterizing the channel; and
transmitting one or more remaining consecutive data symbols on the channel.

13. The method of claim 12, wherein a total number of subcarriers used to carry information in a data symbol is greater than a total number of subcarriers used to carry information in a symbol of the L-SIG field, and
wherein the midamble permits channel characterization for every subcarrier used to carry information in the data symbol.

* * * * *